US012352233B2

(12) United States Patent
Almardi et al.

(10) Patent No.: US 12,352,233 B2
(45) Date of Patent: Jul. 8, 2025

(54) OMNIDIRECTIONAL OMNI-FREQUENCY WAVE ENERGY CONVERTER

(71) Applicant: City University of Hong Kong, Kowloon (HK)

(72) Inventors: Jasim Mohamed Jasim Mohamed Almardi, Kowloon (HK); Walid Daoud, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/530,725

(22) Filed: Dec. 6, 2023

(65) Prior Publication Data

US 2024/0229759 A1    Jul. 11, 2024

Related U.S. Application Data

(60) Provisional application No. 63/437,440, filed on Jan. 6, 2023.

(51) Int. Cl.
*F03B 13/20*    (2006.01)

(52) U.S. Cl.
CPC ........ *F03B 13/20* (2013.01); *F05B 2220/706* (2013.01)

(58) Field of Classification Search
CPC ............................ F03B 13/20; F05B 2220/706
See application file for complete search history.

(56) References Cited

U.S. PATENT DOCUMENTS

| 4,843,250 | A | * | 6/1989 | Stupakis | ................. | F03B 13/20 |
| | | | | | | 60/497 |
| 9,617,972 | B1 | * | 4/2017 | Skaf | ........................ | F03B 13/20 |

FOREIGN PATENT DOCUMENTS

| CN | 114039503 | A | * | 2/2022 | ............. | G01R 31/34 |
| GB | 2618120 | A | * | 11/2023 | ............. | G01R 31/34 |

OTHER PUBLICATIONS

L. Xie, C. G. Menet, H. Ching, R. Du. The Automatic Winding Device of a Mechanical Watch Movement and Its Application in Energy Harvesting, J. Mech. Des., 2008, 131, 071005.
S. Su, R. Du. Signature analysis of mechanical watch movements, Mechanical Systems and Signal Processing, 2007, 21, 3189-3200.
J. A. Paradiso, T. Starner. Energy scavenging for mobile and wireless electronics, IEEE Pervasive Computing, 2005, 4, 18-27.
T. Zhao, M. Xu, X. Xiao, Y. Ma, Z. Li, Z. L. Wang. Recent progress in blue energy harvesting for powering distributed sensors in ocean, Nano Energy, 2021, 88, 106199.
A. Pecher, J. P. Kofoed. Handbook of Ocean Wave Energy, Springer, 2017.
M. Taylor, P. Ralon, H. Anuta, S. Al-Zoghoul. Renewable Power Generation Costs in 2019, IRENA, 2020.

(Continued)

*Primary Examiner* — Viet P Nguyen
(74) *Attorney, Agent, or Firm* — Renner, Kenner, Greive, Bobak, Taylor & Weber

(57) ABSTRACT

A WEC which includes a housing, a stator which is fixed to the housing, a rotor movable to the stator, and an oscillating mass connected to the rotor. The oscillating mass is adapted to oscillate as a result of tilting and horizontal movements of the housing. The oscillating mass is further adapted to rotate along with the rotor. A friction generated between the rotor and the stator upon relative movement between the stator and the rotor induces electricity. The WEC is demonstrated to be able to absorb water-wave energy from all directions and convert the kinetic energy into electrical energy through the R-TENG system under low to high frequency simulated water wave motion.

19 Claims, 20 Drawing Sheets

(56) References Cited

OTHER PUBLICATIONS

K. Koca, A. Kortenhaus, H. Oumeraci, B. Zanuttigh, E. Angelelli, M. Cantù, R. Suffredini, G. Franceschi. Recent Advances in the Development of Wave Energy Converters, the 10th European Wave and Tidal Energy Conference, IEEE, 2013.
B. Drew, A. R. Plummer, M. N. Sahinkaya. A review of wave energy converter technology, The Journal of Power and Energy, 2009, 223, 887-902.
A. Garcia-Teruel, D.I.M. Forehand. A review of geometry optimisation of wave energy converters, Renewable and Sustainable Energy Reviews, 2021, 139, 110593.
K. Ezhilsabareesh, R. Suchithra, K. Thandayutham, A. Samad. Surrogate based optimization of a Bi-Directional impulse turbine for OWC-WEC: Effect of guide vane lean and stagger angle for pseudo-sinusoidal wave conditions, Ocean Engineering, 2021, 226, 108843.
J. Lyu, O. Abdelkhalik, L. Gauchia, L. Optimization of dimensions and layout of an array of wave energy converters, Ocean Engineering, 2019, 192, 106543.
M. Neshat, N. Sergiienko, S. Mirjalili, M. N. Majidi, P. Giuseppe, D. Astiaso Garcia. Multi-Mode Wave Energy Converter Design Optimisation Using an Improved Moth Flame Optimisation Algorithm, Energies, 2021, 14, 3737.
R. Ahamed, K. McKee, I. Howard. Advancements of wave energy converters based on power take off (PTO) systems: A review, Ocean Engineering, 2020, 204, 107248.
X. Zhang, J. Yang. Power capture performance of an oscillating-body WEC with nonlinear snap through PTO systems in irregular waves, Applied Ocean Research, 2015, 52, 261-273.
W. Liu, L. Xu, G. Liu, H. Yang, T. Bu, X. Fu, S. Xu, C. Fang, C. Zhang. Network Topology Optimization of Triboelectric Nanogenerators for Effectively Harvesting Ocean Wave Energy, iScience, 2020, 23, 101848.
Z. L. Wang, T. Jiang X. Liang. Toward the blue energy dream by triboelectric nanogenerator networks, Nano Energy, 2017, 39, 9-23.
Y. Wang, Y. Yang, Z. L. Wang. Triboelectric nanogenerators as flexible power sources, Npj Flexible Electronics, 2017, 1, 1.
Y. Feng, T. Jiang, X. Liang, J. An, Z. L. Wang. Cylindrical triboelectric nanogenerator based on swing structure for efficient harvesting of ultra-low-frequency water wave energy, Applied Physics Reviews, 2020, 7, 021401.
K. Lee, J. W. Lee, K. Kim, D. Yoo, D. S. Kim, W. Hwang, I. Song, J. Y. A. Sim. A Spherical Hybrid Triboelectric Nanogenerator for Enhanced Water Wave Energy Harvesting, Micromachines, 2018, 9, 598.
X. Liang, T. Jiang, G. Liu, F. Yawei, C. Zhang, Z. L. Wang. Spherical triboelectric nanogenerator integrated with power management module for harvesting multidirectional water wave energy, Energy & Environmental Science, 2019, 13, 277-285.
L. Liu, Q. Shi, C. Lee. A Novel Hybridized Blue Energy Harvester Aiming at Allweather IoT Applications, Nano Energy, 2020, 76, 105052.
X. Liang, Z. Liu, F. Yawei, H. Jiajia, L. Li, J. An, P. Chen, T. Jiang, Z. Wang. Spherical triboelectric nanogenerator based on spring-assisted swing structure for effective water wave energy harvesting, Nano Energy, 2021, 83, 105836.
D. Zhang, J. Shi, Y. Si, T. Li. Multi-grating triboelectric nanogenerator for harvesting low-frequency ocean wave energy, Nano Energy, 2019, 61, 132-140 (2019).
B. Zhao, Z. Li, X. Liao, L. Qiao, Y. Li, S. Dong, Z. Zhang, B. Zhang. A heaving point absorber-based ocean wave energy converter hybridizing a multilayered soft-brush 25 cylindrical triboelectric generator and an electromagnetic generator, Nano Energy, 2021, 89, 106381.
Y. Yang, X. Yu, L. Meng, X. Li, Y. Xu, T. Cheng, S. Liu, Z. Wang. Triboelectric nanogenerator with double rocker structure design for ultra-low-frequency wave fullstroke energy harvesting, Extreme Mechanics Letters, 2021, 46, 101338.
D. Guan, X. Cong, J. Li, H. Shen, C. Zhang, J. Gong. Quantitative characterization of the energy harvesting performance of soft-contact sphere triboelectric nanogenerator, Nano Energy, 2021, 87, 106186.
K. Tao, H. Yi, Y. Yang, H. Chang, J. Wu, L. Tang, Z. Yang, N. Wang, L. Hu, Y. Q. Fu, J. Miao, W. Yuan. Origami-inspired electret-based triboelectric generator for biomechanical and ocean wave energy harvesting, Nano Energy, 2020, 67, 104197.
Z. Lin, B. Zhang, H. Guo, Z. Wu, H. Zou, J. Yang, Z. L. Wang. Super-robust and frequency-multiplied triboelectric nanogenerator for efficient harvesting water and wind energy, Nano Energy, 2019, 64, 103908.
P. Rui, W. Zhang, Y. Zhong, X. Wei, Y. Guo, S. Shi, Y. Liao, J. Cheng, P. Wang. High-performance cylindrical pendulum shaped triboelectric nanogenerators driven by water wave energy for full-automatic and self-powered wireless hydrological monitoring system, Nano Energy, 2020, 74, 104937.
Y. Wu, J. Qu, P. K. Chu, D. M. Shin, Y. Luo, S. P. Feng. Hybrid photovoltaictriboelectric nanogenerators for simultaneously harvesting solar and mechanical energies, Nano Energy, 2021, 89, 106376.
Y. Feng, X. Liang, J. An, T. Jiang, Z. L. Wang. Soft-contact cylindrical triboelectricelectromagnetic hybrid nanogenerator based on swing structure for ultra-low frequency water wave energy harvesting, Nano Energy, 2021, 81, 105625.
H. Zhang, L. He, L. Zhou, O. Yang, W. Yuan, X. Wei, Y. Liu, L. Lu, J. Wang, Z. L. Wang. Active resonance triboelectric nanogenerator for harvesting omnidirectional water-wave energy, Joule, 2021, 5, 6.
T. Jiang, H. Pang, J. An, P. Lu, Y. Feng, X. Liang, W. Zhong, Z. L. Wang. Robust Swing-Structured Triboelectric Nanogenerator for Efficient Blue Energy Harvesting, Advanced Energy Materials, 2020, 10, 2000064.
Y. Wang, N. Matin, J. Wang, K. Xia, D. Wang, X. Ji, P. Jiao. Rolling Spherical Triboelectric Nanogenerators (RS-Teng) under Low-Frequency Ocean Wave Action, Marine Science and Engineering, 2021, 10.
C. Hao, J. He, Z. Zhang, Y. Yuan, X. Chou, C. Xue. A pendulum hybrid generator for water wave energy harvesting and hydrophone-based wireless sensing, AIP Advances, 2020, 10, 125019.
X. Chen, L. Gao, J. Chen, S. Lu, H. Zhou, T. Wang, A. Wang, Z. Zhang, S. Guo, X. Mu, Z. L. Wang, Y. Yang. A chaotic pendulum triboelectric-electromagnetic hybridized nanogenerator for wave energy scavenging and self-powered wireless sensing system, Nano Energy, 2020, 69, 104440.
J. An, Z. M. Wang, T. Jiang, X. Liang, Z. L. Wang. Whirling-Folded Triboelectric Nanogenerator with High Average Power for Water Wave Energy Harvesting, Advanced Functional Materials, 2019, 29, 1904867.
X. Xie, X. Chen, C. Zhao, Y. Liu, X. Sun, C. Zhao, Z. Wen. Intermediate layer for enhanced triboelectric nanogenerator, Nano Energy, 2021, 79, 105439.
A. Toffoli, E. M. Aitner-Gregersen. Types of Ocean Surface Waves, Wave Classification. Encyclopedia of Maritime and Offshore Engineering, Wiley, 2017.

\* cited by examiner

OMNIDIRECTIONAL OMNI-FREQUENCY WAVE ENERGY CONVERTER

FIELD OF INVENTION

This invention relates to wave energy, and in particular to wave energy converters that generate electricity.

BACKGROUND OF INVENTION

Approximately 70% of the Earth's surface is covered in a continuously moving body of water. Currently, blue energy is generated from kinetic energy of wind-generated waves, tidal currents and thermal energy from the sun heating the oceans[4]. For the ocean's kinetic energy, it is harvested and transformed into electrical energy by wave energy converters (WECs). Ocean wave energy is estimated to have an annual power resource of 3 TW globally[5]. However, existing WECs lack competitiveness when compared to solar panels and wind turbines due to their construction, operation, transmission, and maintenance costs[6]. In addition, mooring costs are also significant since most WECs are designed to be installed at distant offshore locations and need to withstand harsh environments, with the cost of construction increasing the further the WECs are from the shore[7,8]. Reducing these costs through design optimization is a major interest for researchers[9-11].

Most commonly, design optimization of WECs is carried out through improvements to devices' hull geometries, power take-off (PTO) or electrical circuit and network designs[12-15]. PTO systems commonly involve hydraulic systems, turbines and direct mechanical or electrical drive systems that harvest the kinetic energy and transform it into mechanical energy by rotational or linear movements which are then transformed into electrical energy by electromagnetic generators[5]. Recent studies, however, have focused on smaller scale prototype designs that involve triboelectric nanogenerators (TENG)[16], being cost-effective, simpler to fabricate, scalable, and have a high-power conversion efficiency[17]. In recent years, many device architectures to harvest blue energy, including cylindrical, spherical, pendulum, multi-grating, hybrid, and origami-inspired, have been explored[18-37].

REFERENCES

The following references are referred to throughout this specification, as indicated by the numbered brackets:
[1] L. Xie, C. G. Menet, H. Ching, R. Du. The Automatic Winding Device of a Mechanical Watch Movement and Its Application in Energy Harvesting, J. Mech. Des., 2008, 131, 071005.
[2] S. Su, R. Du. Signature analysis of mechanical watch movements, Mechanical Systems and Signal Processing, 2007, 21, 3189-3200.
[3] J. A. Paradiso, T. Starner. Energy scavenging for mobile and wireless electronics, IEEE Pervasive Computing, 2005, 4, 18-27.
[4] T. Zhao, M. Xu, X. Xiao, Y. Ma, Z. Li, Z. L. Wang. Recent progress in blue energy harvesting for powering distributed sensors in ocean, Nano Energy, 2021, 88, 106199.
[5] A. Pecher, J. P. Kofoed. Handbook of Ocean Wave Energy, Springer, 2017.
[6] M. Taylor, P. Ralon, H. Anuta, S. Al-Zoghoul. Renewable Power Generation Costs in 2019, IRENA, 2020.
[7] K. Koca, A. Kortenhaus, H. Oumeraci, B. Zanuttigh, E. Angelelli, M. Canth, R. Suffredini, G. Franceschi. Recent Advances in the Development of Wave Energy Converters, the 10th European Wave and Tidal Energy Conference, IEEE, 2013.
[8] B. Drew, A. R. Plummer, M. N. Sahinkaya. A review of wave energy converter technology, The Journal of Power and Energy, 2009, 223, 887-902.
[9] A. Garcia-Teruel, D. I. M. Forehand. A review of geometry optimisation of wave energy converters, Renewable and Sustainable Energy Reviews, 2021, 139, 110593.
[10] K. Ezhilsabareesh, R. Suchithra, K. Thandayutham, A. Samad. Surrogate based optimization of a Bi-Directional impulse turbine for OWC-WEC: Effect of guide vane lean and stagger angle for pseudo-sinusoidal wave conditions, Ocean Engineering, 2021, 226, 108843.
[11] J. Lyu, O. Abdelkhalik, L. Gauchia, L. Optimization of dimensions and layout of an array of wave energy converters, Ocean Engineering, 2019, 192, 106543.
[12] M. Neshat, N. Sergiienko, S. Mirjalili, M. N. Majidi, P. Giuseppe, D. Astiaso Garcia. Multi-Mode Wave Energy Converter Design Optimisation Using an Improved Moth Flame Optimisation Algorithm, Energies, 2021, 14, 3737.
[13] R. Ahamed, K. McKee, I. Howard. Advancements of wave energy converters based on power take off (PTO) systems: A review, Ocean Engineering, 2020, 204, 107248.
[14] X. Zhang, J. Yang. Power capture performance of an oscillating-body WEC with nonlinear snap through PTO systems in irregular waves, Applied Ocean Research, 2015, 52, 261-273.
[15] W. Liu, L. Xu, G. Liu, H. Yang, T. Bu, X. Fu, S. Xu, C. Fang, C. Zhang. Network Topology Optimization of Triboelectric Nanogenerators for Effectively Harvesting Ocean Wave Energy, iScience, 2020, 23, 101848.
[16] Z. L. Wang, T. Jiang X. Liang. Toward the blue energy dream by triboelectric nanogenerator networks, Nano Energy, 2017, 39, 9-23.
[17] Y. Wang, Y. Yang, Z. L. Wang. Triboelectric nanogenerators as flexible power sources, Npj Flexible Electronics, 2017, 1, 1.
[18] Y. Feng, T. Jiang, X. Liang, J. An, Z. L. Wang. Cylindrical triboelectric nanogenerator based on swing structure for efficient harvesting of ultra-low-frequency water wave energy, Applied Physics Reviews, 2020, 7, 021401.
[19] K. Lee, J. W. Lee, K. Kim, D. Yoo, D. S. Kim, W. Hwang, I. Song, J. Y. A. Sim. A Spherical Hybrid Triboelectric Nanogenerator for Enhanced Water Wave Energy Harvesting, Micromachines, 2018, 9, 598.
[20] X. Liang, T. Jiang, G. Liu, F. Yawei, C. Zhang, Z. L. Wang. Spherical triboelectric nanogenerator integrated with power management module for harvesting multidirectional water wave energy, Energy & Environmental Science, 2019, 13, 277-285.
[21] L. Liu, Q. Shi, C. Lee. A Novel Hybridized Blue Energy Harvester Aiming at All-weather IoT Applications, Nano Energy, 2020, 76, 105052.
[22] X. Liang, Z. Liu, F. Yawei, H. Jiajia, L. Li, J. An, P. Chen, T. Jiang, Z. Wang. Spherical triboelectric nanogenerator based on spring-assisted swing structure for effective water wave energy harvesting, Nano Energy, 2021, 83, 105836.
[23] D. Zhang, J. Shi, Y. Si, T. Li. Multi-grating triboelectric nanogenerator for harvesting low-frequency ocean wave energy, Nano Energy, 2019, 61, 132-140 (2019).

[24] B. Zhao, Z. Li, X. Liao, L. Qiao, Y. Li, S. Dong, Z. Zhang, B. Zhang. A heaving point absorber-based ocean wave energy converter hybridizing a multilayered soft-brush cylindrical triboelectric generator and an electromagnetic generator, Nano Energy, 2021, 89, 106381.

[25] Y. Yang, X. Yu, L. Meng, X. Li, Y. Xu, T. Cheng, S. Liu, Z. Wang. Triboelectric nanogenerator with double rocker structure design for ultra-low-frequency wave full-stroke energy harvesting, Extreme Mechanics Letters, 2021, 46, 101338.

[26] D. Guan, X. Cong, J. Li, H. Shen, C. Zhang, J. Gong. Quantitative characterization of the energy harvesting performance of soft-contact sphere triboelectric nanogenerator, Nano Energy, 2021, 87, 106186.

[27] K. Tao, H. Yi, Y. Yang, H. Chang, J. Wu, L. Tang, Z. Yang, N. Wang, L. Hu, Y. Q. Fu, J. Miao, W. Yuan. Origami-inspired electret-based triboelectric generator for biomechanical and ocean wave energy harvesting, Nano Energy, 2020, 67, 104197.

[28] Z. Lin, B. Zhang, H. Guo, Z. Wu, H. Zou, J. Yang, Z. L. Wang. Super-robust and frequency-multiplied triboelectric nanogenerator for efficient harvesting water and wind energy, Nano Energy, 2019, 64, 103908.

[29] P. Rui, W. Zhang, Y. Zhong, X. Wei, Y. Guo, S. Shi, Y. Liao, J. Cheng, P. Wang. High-performance cylindrical pendulum shaped triboelectric nanogenerators driven by water wave energy for full-automatic and self-powered wireless hydrological monitoring system, Nano Energy, 2020, 74, 104937.

[30] Y. Wu, J. Qu, P. K. Chu, D. M. Shin, Y. Luo, S. P. Feng. Hybrid photovoltaic-triboelectric nanogenerators for simultaneously harvesting solar and mechanical energies, Nano Energy, 2021, 89, 106376.

[31] Y. Feng, X. Liang, J. An, T. Jiang, Z. L. Wang. Soft-contact cylindrical triboelectric-electromagnetic hybrid nanogenerator based on swing structure for ultra-low frequency water wave energy harvesting, Nano Energy, 2021, 81, 105625.

[32] H. Zhang, L. He, L. Zhou, O. Yang, W. Yuan, X. Wei, Y. Liu, L. Lu, J. Wang, Z. L. Wang. Active resonance triboelectric nanogenerator for harvesting omnidirectional water-wave energy, Joule, 2021, 5, 6.

[33] T. Jiang, H. Pang, J. An, P. Lu, Y. Feng, X. Liang, W. Zhong, Z. L. Wang.
Robust Swing-Structured Triboelectric Nanogenerator for Efficient Blue Energy Harvesting, Advanced Energy Materials, 2020, 10, 2000064.

[34] Y. Wang, N. Matin, J. Wang, K. Xia, D. Wang, X. Ji, P. Jiao. Rolling Spherical Triboelectric Nanogenerators (RS-TENG) under Low-Frequency Ocean Wave Action, Marine Science and Engineering, 2021, 10, 5.

[35] C. Hao, J. He, Z. Zhang, Y. Yuan, X. Chou, C. Xue. A pendulum hybrid generator for water wave energy harvesting and hydrophone-based wireless sensing, AIP Advances, 2020, 10, 125019.

[36] X. Chen, L. Gao, J. Chen, S. Lu, H. Zhou, T. Wang, A. Wang, Z. Zhang, S. Guo, X. Mu, Z. L. Wang, Y. Yang. A chaotic pendulum triboelectric-electromagnetic hybridized nanogenerator for wave energy scavenging and self-powered wireless sensing system, Nano Energy, 2020, 69, 104440.

[37] J. An, Z. M. Wang, T. Jiang, X. Liang, Z. L. Wang. Whirling-Folded Triboelectric Nanogenerator with High Average Power for Water Wave Energy Harvesting, Advanced Functional Materials, 2019, 29, 1904867.

[38] X. Xie, X. Chen, C. Zhao, Y. Liu, X. Sun, C. Zhao, Z. Wen. Intermediate layer for enhanced triboelectric nanogenerator, Nano Energy, 2021, 79, 105439.

[39] A. Toffoli, E. M. Aitner-Gregersen. Types of Ocean Surface Waves, Wave Classification. Encyclopedia of Maritime and Offshore Engineering, Wiley, 2017.

SUMMARY OF INVENTION

The invention in one aspect provides a WEC which includes a housing, a stator which is fixed to the housing, a rotor movable to the stator, and an oscillating mass connected to the rotor. The oscillating mass is adapted to oscillate as a result of tilting and horizontal movements of the housing. The oscillating mass is further adapted to rotate along with the rotor. Friction generated between the rotor and the stator upon relative movement between the stator and the rotor generates electricity.

In some embodiments, the WEC further contains a pair of electrodes attached to a substrate of the stator. The electricity is adapted to be induced from friction between the rotor and the pair of electrodes.

In some embodiments, the substrate is in a substantially circular shape.

In some embodiments, the rotor further contains a rotor shaft and a rotor body. The oscillating mass is connected to the rotor shaft for co-rotation with the rotor.

In some embodiments, the rotor body is wrapped with a dielectric film that is in soft contact with the electrodes.

In some embodiments, the dielectric film is a sheet of fluorinated ethylene propylene (FEP).

In some embodiments, the oscillating mass includes an inner portion and an outer portion that are aligned along a radial direction with respect to oscillation of the oscillating mass. The outer portion is heavier than the inner portion.

In some embodiments, the inner portion of the oscillating mass is formed with a hole for coupling to the rotor shaft of the rotor.

In some embodiments, an axis of oscillation of the oscillating mass coincides with a rotating axis of the rotor shaft.

In some embodiments, the rotor body has a shape of a circular sector.

In some embodiments, the electrodes are each in a planar shape, and the electrodes are superimposed one over another.

In some embodiments, one or both of the electrodes are formed with patterns of circular sectors.

In some embodiments, the WEC contains a pair of rotational triboelectric nanogenerators (R-TENGs) each of which containing one said rotor, one said stator, and one said pair of electrodes.

In some embodiments, each stator contains a substrate, and the two substrates are separated but connected to each other by a plurality of connecting poles.

In some embodiments, the oscillating mass is located substantially within a space defined by the two substrates. Both of the rotors are connected to the oscillating mass.

In some embodiments, the oscillating mass is adapted to rotate 360° in clockwise and anticlockwise directions.

In some embodiments, the oscillating mass or the substrate is made from a polylactic acid (PLA) material.

In some embodiments, the housing has a substantially spherical shape.

In some embodiments, the housing is made from a polycarbonate (PC) material.

Embodiments of the invention provide a WEC that could overcome the existing challenges by having simply designed, yet sophisticated components that allow the wave energy converter to work in nearshore environments exposed to low frequency water waves. Through experiments it was shown that the WEC could also work in high frequency water wave environments. By adopting the kinetic energy harvesting technology of the automatic watch's oscillating weight, the WEC's oscillating weight can effectively harvest the kinetic energy from ocean waves propagating from multiple directions and varying frequencies and convert it into a mechanical motion that drives the rotors of the R-TENGs to generate electrical energy.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 5b shows a top view of the assembly in FIG. 5a.

FIG. 7c illustrates tip trajectory plots showing the movement of a selected tip of the oscillation weight of FIG. 7a.

FIG. 8a shows a top view of the perpendicular arrangement of the oscillating weight and the rotors in the assembly of FIG. 5a.

FIG. 10b shows the open-circuit voltage measurements when the WEC was driven from 1 to 8 Hz in the experimental setup of FIG. 10a.

FIG. 10c shows the short-circuit current measurements when the WEC was driven from 1 to 8 Hz in the experimental setup of FIG. 10a.

FIG. 11b shows the open-circuit voltage when the WEC was driven by the wave-making motor at 2 Hz in the experimental setup of FIG. 11a.

FIG. 11c shows the short-circuit current when the WEC was driven by the wave-making motor at 2 Hz in the experimental setup of FIG. 11a.

FIG. 11d illustrates voltage and current under increasing load resistance for the WEC in the experimental setup of FIG. 11a.

FIG. 11e illustrates power output and power density under increasing load resistance for the WEC in the experimental setup of FIG. 11a.

FIG. 12b shows rectified open-circuit voltage and short-circuit current for 1 and 2 units of the WEC in the experimental setup of FIG. 12a.

FIG. 12c shows capacitor charging performance when the WEC was driven by the linear motor at 8 Hz in the experimental setup of FIG. 12a.

FIG. 12d shows capacitor charging performance for 1 and 2 WEC units tested in the wave tank at 2 Hz in the experimental setup of FIG. 12a.

DETAILED DESCRIPTION

Figure 1:
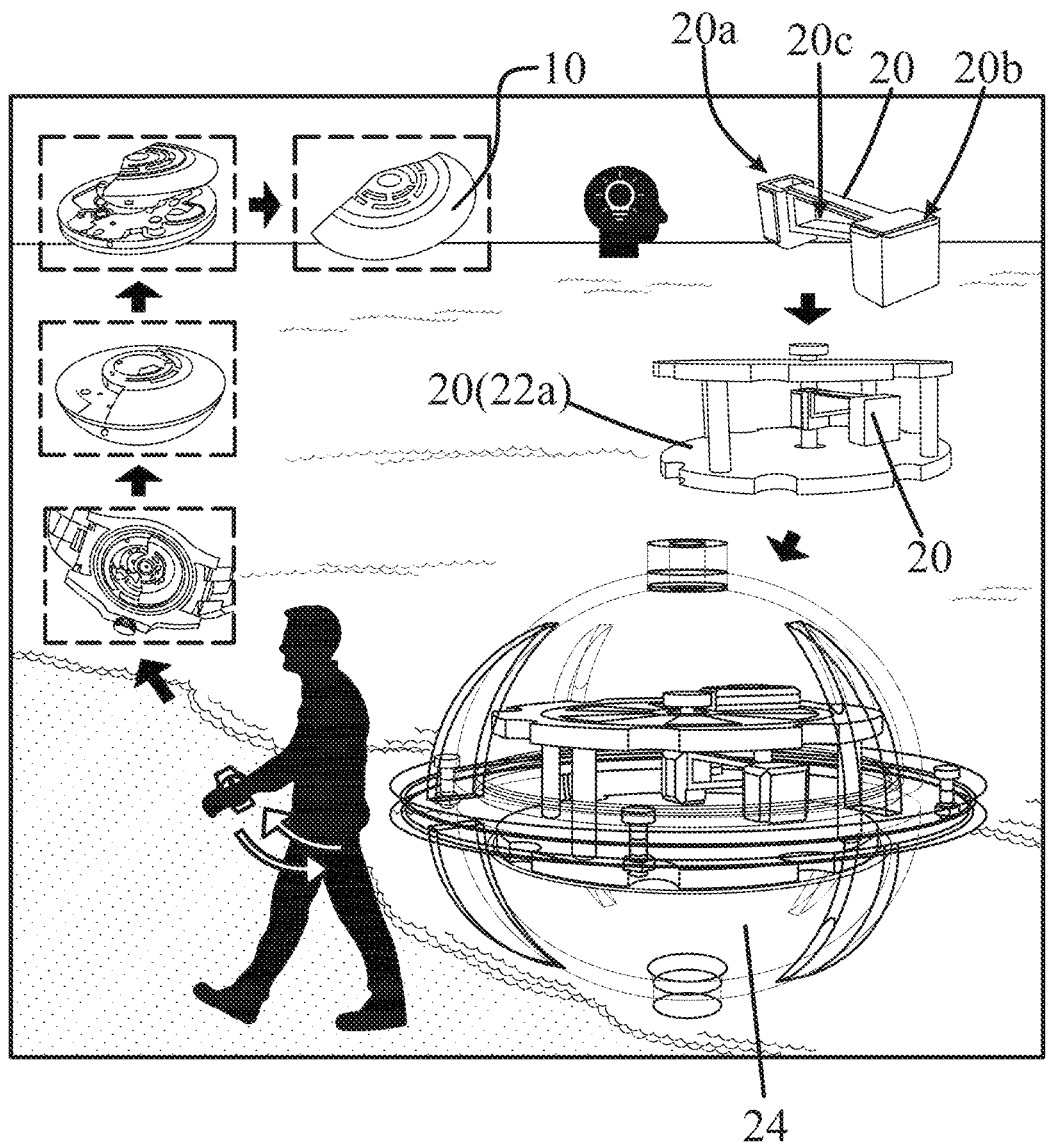
FIG. 1 illustrates the design process of the WEC according to an embodiment of the invention.
Figure 2:
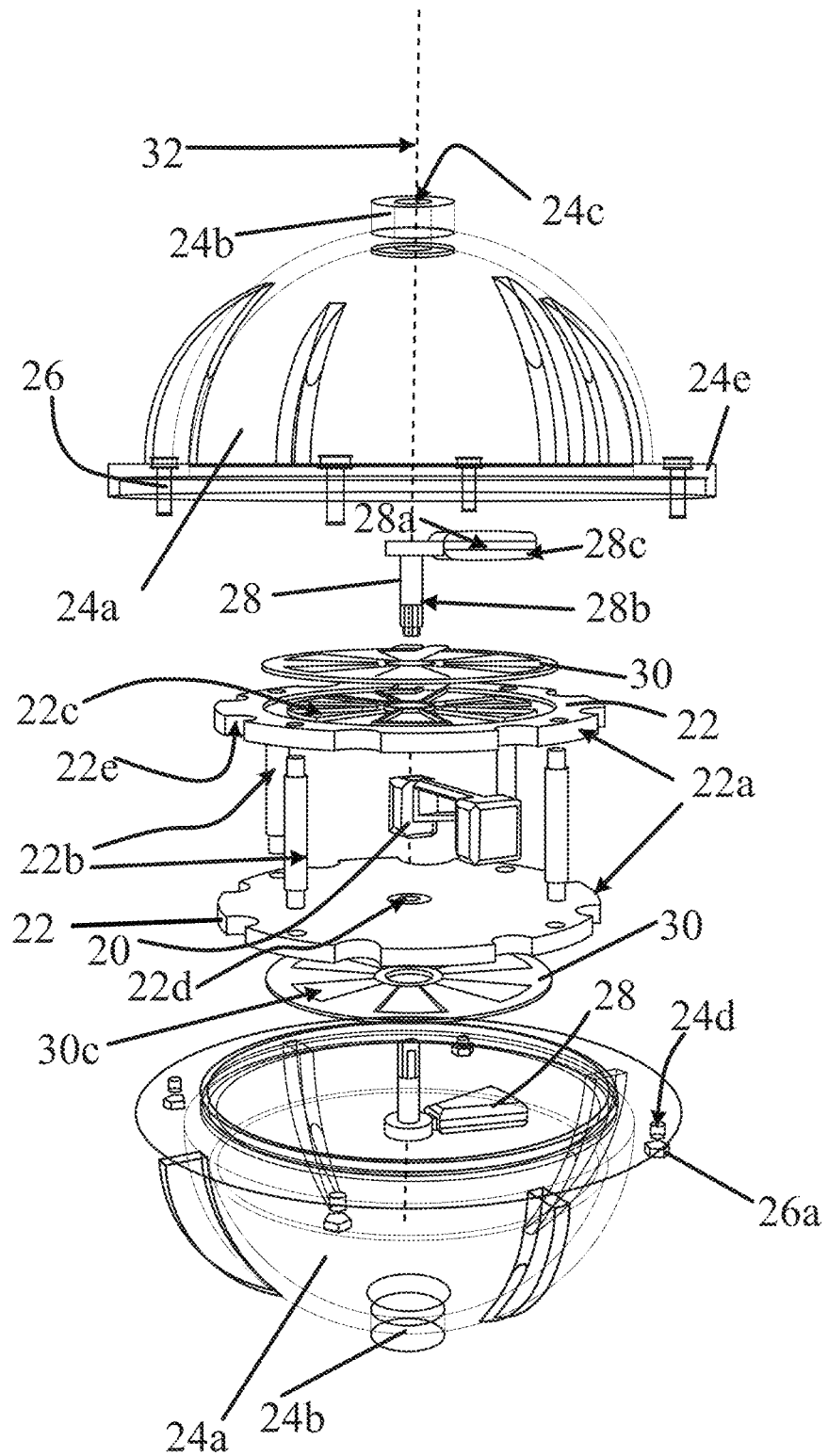
FIG. 2 is an exploded view of the WEC in FIG. 1.

FIGS. 1-2 depict a WEC according to a first embodiment of the invention. The WEC is a floating rotating mass type WEC, which is designed and built to harvest kinetic energy from omnidirectional, low to high frequency ocean waves without requiring a mooring system connecting it to the seabed. The WEC contains an automatic watch inspired oscillating weight interconnected with a pair of interconnected R-TENGs. The R-TENGs are bidirectional as they can rotate in clockwise and counterclockwise directions depending on the movement direction of the oscillating weight. The oscillating weight moves similarly to an automatic watch's oscillating weight and its design was optimized using MBD simulation. The WEC design in this embodiment offers a new device architecture that is simple to build and upscale.

FIG. 1 illustrates the process of designing the WEC. The idea of the WEC initially comes from automatic watches worn by humans on their wrists, where the automatic watch contains a spiral spring (i.e., the mainspring) which is wound by energy from the natural arm motions of the wearer, such that no manual winding is necessary for the watch to work. A semicircular oscillating weight 10 which is pivoted at the center of the watch rotates with every arm motion, and a winding mechanism uses rotations in both directions to wind the mainspring. The oscillating weight in the automatic watch inspired inventors of the present invention, and the WEC in FIG. 1 thus contains a main component which is an oscillating weight 20 (i.e., a oscillating mass). Unlike the semicircular weight 10, the oscillating weight 20 has an elongated shape defining two ends. An inner end portion 20a of the oscillating weight 20 is assembled in the WEC on an oscillation axis (not shown) of the oscillating weight 20. The inner end portion 20a has the shape of a sleeve which has a hole (not shown) at its center, and the hole allows the shafts of two rotors (not shown in FIG. 1) to interconnect and be driven by the oscillating weight 20, which will be described in more details below. An outer end portion 20b of the oscillating weight 20 moves along a circumferential direction and is located radially outward as compared to the inner end portion 20a. The outer end portion 20b has a main surface that is in the shape of a square, and its three-dimensional dimension is larger than that of the inner end portion 20a. The oscillating weight 20 has its concentration of weight located at the outer end portion 20b. The outer end portion 20b is connected to the inner end portion 20a via a connecting portion 20c that has the shape of a hollow triangle, which connects to the inner end portion 20a at a side of the triangle, and to the outer end portion 20b of an apex of the triangle.

The oscillating weight 20 can be fabricated either as a single-piece part or as a two-pieces part. In either case, the oscillating weight 20 is designed for example using computer aided design (CAD) and is 3D printed with a PLA material. However, in the case of two-pieces part the outer end portion 20b of the oscillating weight 20 may be made of stainless-steel cut by CNC (Computerized Numerical Control) machining. The oscillating weight 20 as assembled in the WEC is located between two stators 22 (i.e., between an upper substrate 22a and a lower substrate 22a which respectively form the two stators 22 of the R-TENGs of the WEC). The stators 22 and the oscillating weight 20 are situated within a spherical hull 24 which acts as a housing for the WEC. Each stator 22 includes a corresponding substrate 22a.

The structures of the stators 22 and the hull 24 are best illustrated in FIG. 2. The stators 22 are symmetrical to each other about a horizontal plane (not shown) which intersects the oscillating weight 20. An oscillation axis 32 of the oscillating weight 20 is perpendicular to the horizontal plane. As such, the two substrate 22a are concentrically arranged. For each stator 22 the corresponding substrate 22a is substantially disc-shaped, but with some semi-circular notches 22e formed at the perimeter of the substrate 22a. In addition, each substrate 22a is formed with an aperture 22d at its center. The two substrates 22a are interconnected by four connecting rods 22b that extend along the direction of the oscillation axis 32 of the oscillating weight 20. The connecting rods 22b are plugged into corresponding holes (not shown) on the substrates 22a at both ends of the connecting rods 22b.

Figure 3A:
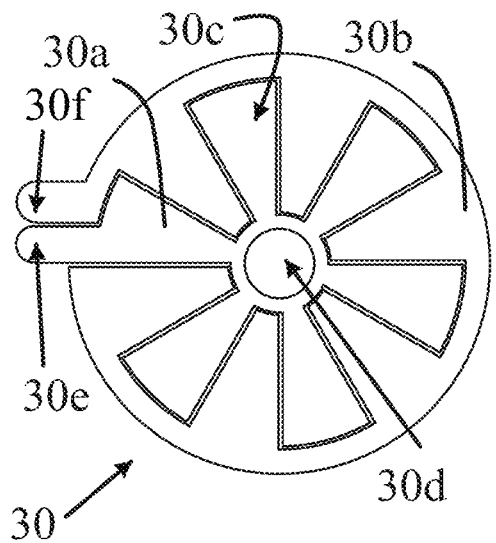
FIG. 3a shows a top view of the electrode pair of each R-TENG in the WEC of FIGS. 1-2.
Figure 3B:
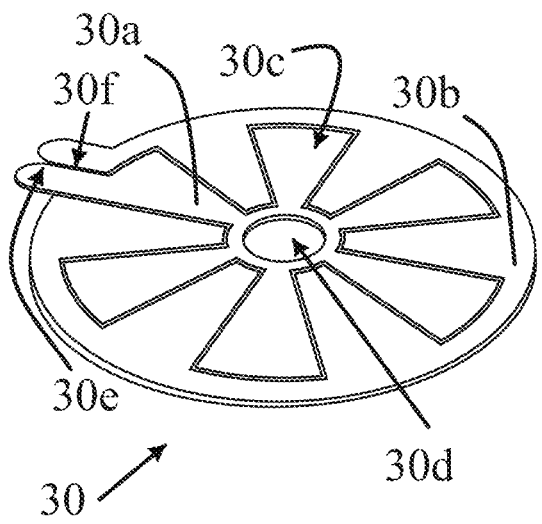
FIG. 3b shows a perspective view of the electrode pair of each R-TENG in the WEC of FIGS. 1-2.

On the surface of each substrate 22a away from the oscillation weight 20, there is an electrode pair 30 which contains two sheet-like electrodes superimposed one over another, and which are electrically connected to each other. The electrode pair 30 is best shown in FIGS. 3a-3b, which includes a first electrode 30a and a second electrode 30b. The first electrode 30a contains a plurality of circular sectors 30c uniformly distributed along the circumferential direction and which are connected at a hub at the center of the first electrode 30a. The first electrode 30a generally has the shape of a fan blade. On the other hand, the second electrode 30b has a substantially round shape, and on its surface there are a plurality of recesses (not shown) which are configured to receive the corresponding circular sectors 30c of the first electrode 30a. At the center of both the first electrode 30a and the second electrode 30b there is an aperture 30d which are used to assemble with a shaft 28b of a corresponding rotor 28. Also, for the first electrode 30a there is a first tab 30e protruding away from the center of the first electrode 30a along a radial direction. Similarly, for the second electrode 30b there is a second tab 30f protruding away from the center of the second electrode 30b along a radial direction. The first and second tabs 30e, 30f are adjacent to each other and are configured for connecting the first and second electrode 30a, 30b to wires (not shown) that connect the WEC to external devices (not shown). Corresponding with the shape of a corresponding electrode pair 30, on each substrate 22a there is a recess 22c formed to receive the electrode pair 30. From FIG. 2 one can see that the recess 22c has portions corresponding to the shapes of the circular sectors 30c of the first electrode 30a, and to the round shape of the second electrode 30b. Both the electrodes 30a, 30b and the substrates 22a may be designed using CAD. In one implementation, the CAD model for the substrates 22a is designed as a 4 mm thick holder of the electrodes 30a, 30b and 3D printed with PLA material. As for the CAD models for the electrodes 30a, 30b, they were fabricated by CNC machining of a 1 mm copper sheet. Preferably, the 1 mm copper electrodes were coated with 80 nm gold coating by thermal evaporation.

Each of the two substrates 22a and its corresponding electrode pair 30 form a stator 22 for an R-TENG, and in the WEC of FIGS. 1-2, there is a pair of R-TENGs that are concentrically configured and opposite to each other. Each R-TENG contains further a rotor 28 which contains a rotor body 28a and a shaft 28b. Each rotor 28 is wrapped with a dielectric film 28c that is in soft contact with the metal electrodes of the triboelectric nanogenerator system. The two rotors 28 (i.e., upper and lower rotors) interconnect through the oscillating weight 20, and in particular by the two shafts 28b extending into the hole of the inner end portion 20a of the oscillating weight 20. The movement of the oscillating weight 20 directly drives the movement of the rotors 28. The two rotors 28 are rotationally fixed to each other. For each rotor 28, the body 28a and the shaft 28b form an "L" shape and the shaft 28b is inserted into the hole of the inner end portion 20a of the oscillating weight 20 through central apertures 30d of both the corresponding pair of electrodes 30 and also through the central aperture 22d of corresponding substrate 22a. Once the two R-TENGS are assembled, the shafts 28b of the rotors 28 interconnect through the hole of the inner end portion of the oscillating weight 20a. The rotor body 28a has a shape of a circular sector that is similar to the shape of a circular sector 30c on the first electrode 30a. The thickness of the rotor body 28a along the direction of the oscillation axis 32 is larger than that of the electrode pair 30. In one implementation, the rotors 28 are designed using CAD and 3D printed with PLA material. Each rotor 28 is wrapped with a sheet of FEP of 0.2 mm thickness.

The hull 24 consists of two identical halves 24a each having a dome shape. At the tip end of the dome shape there is a stud 24b formed which protrudes away from the center of the sphere forming the hull 24. The stud 24b has a central opening 24c that enables wires (not shown) to extend outside the hull 24. At the end of each half 24a opposite to the stud 24b there is a flange 24e that contains multiple mounting holes 24d. A plurality of fasteners 26 connect the two halves 24a together and enclose the oscillating weight 20, the rotors 28, and the stators 22 of the R-TENGs. In one implementation, the hull 24 is designed using CAD and is 3D printed with PC material. Sanding and polishing are done to the printed part to achieve the final smooth finish. To attach the lower and upper halves 24a and make it airtight, 4 M3 screws are used as the fasteners 26 and nuts 26a are used to firmly fix the parts. One can see from FIG. 2 that the entire WEC has a symmetrical shape as two R-TENGs are configured symmetrically.

Having described the structure of the WEC in FIGS. 1-2, the working principle of the WEC will now be described. The WEC is adapted to absorb kinetic energy from the ocean waves through the oscillating weight 20 that moves with every tilting and horizontal motion of the WEC's hull 24. The oscillating weight 20 is free to rotate 360° in clockwise and anticlockwise directions. The movement of the hull 24 drives the movement of the oscillating weight 20, which in turn, drives the movement of the rotors 28 of the R-TENG system. The rotors 28 can move with the movement of the hull 24 due to the interconnection between the oscillating weight 20 and the rotors 28. The movement of the rotor 28 induces friction (i.e., sliding-mode triboelectric nanogenerator) between the dielectric film 28c and the metal electrodes 30. This friction charges the dielectric film which causes electrons of one metal electrode 30 to flow to another metal electrode 30 along the load circuit via electrostatic induction and electron flow from one metal electrode to another induces the current flow in the opposite direction, hence, electricity generation.

Two prototypes of the WEC of FIGS. 1-2 were built and tested. There are wires connecting the electrodes 30 of the WEC and extending to the outside of the hull 24 via the stud's central opening 24c as mentioned above. These wires were connected to an oscilloscope (not shown) to test the electrical performance of the WEC. Hand-shaking of the WEC unit was done to generate the electrical output. From the tests (see Table 1 below) it is evident that the output of the device improved by improving the selection of triboelectric materials, as well as by increasing the weight at the tip of the oscillating weight. The device is made to withstand harsh marine environments.

TABLE 1

Specifications and electrical output for WEC examples when tested by hand-shaking

| Device | Oscillating Weight Specification | Electrodes Specification | Electric Output $V_{OC}$/V | Electric Output $I_{SC}$/μA |
|---|---|---|---|---|
| Example 1 | Single piece PLA material with concentration of weight at outer tip | Fabricated by CNC machining of a 1 mm copper sheet without any surface coating | 14.0 | 1.00 |
| Example 2 | 2-piece part with shaft printed in PLA material and tip fabricated by CNC machining of stainless steel | Fabricated by CNC machining of a 1 mm copper sheet with gold surface coating by thermal evaporator | 40.8 | 2.85 |

Figure 4:
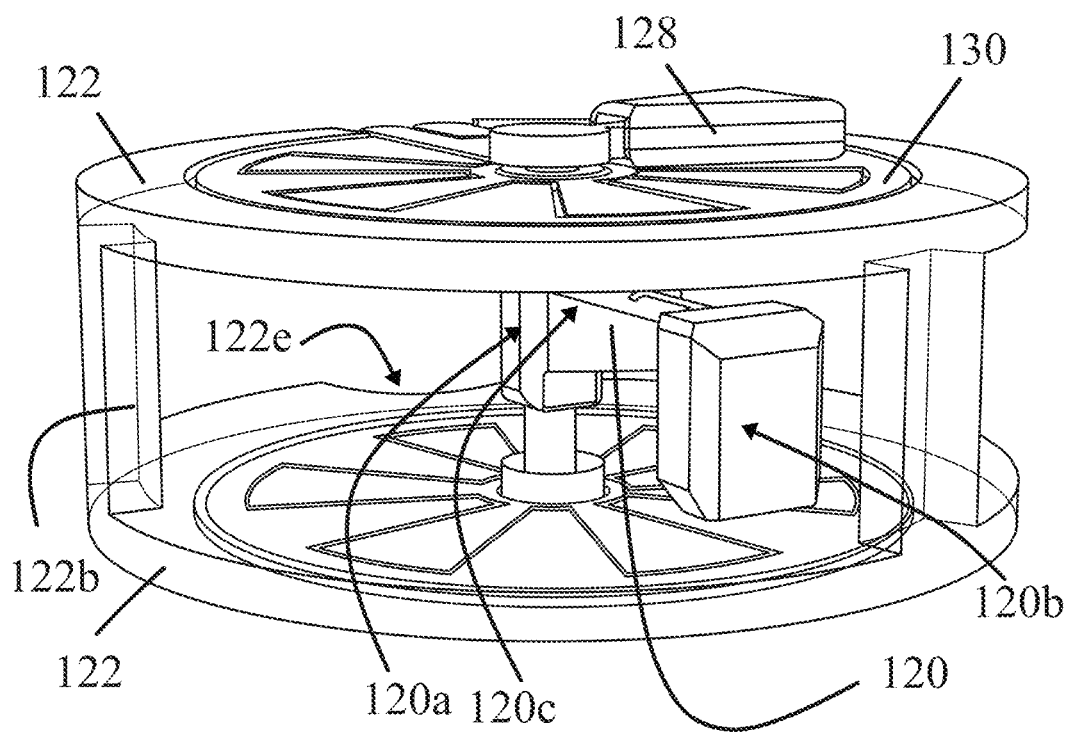
FIG. 4 is a perspective view of a WEC according to another embodiment of the invention, where hull of the WEC is omitted.
Figure 9A:
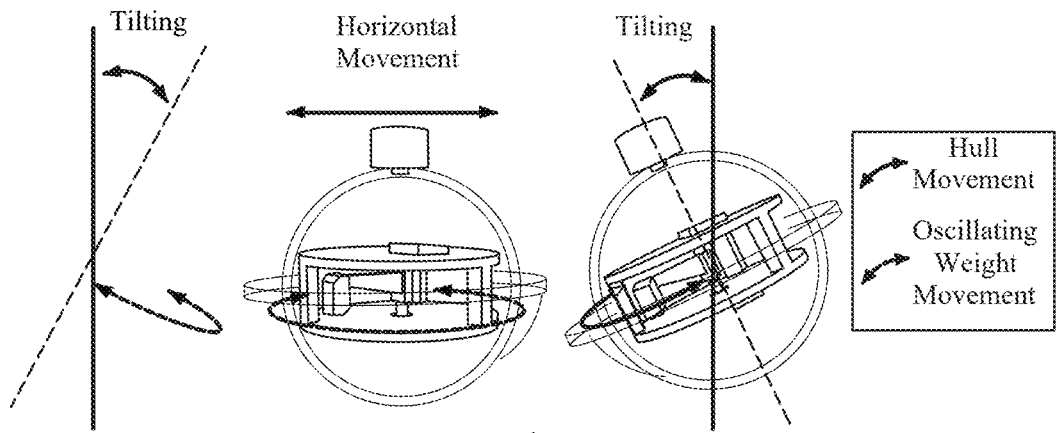
FIG. 9a illustrates the movement mechanism of the WEC in FIGS. 4-6b.

Turning to FIGS. 4-6b, a WEC according to another embodiment of the invention has generally the same structure and function as the WEC in FIGS. 1-2. For the sake of illustration the hull 124 (which is shown in FIG. 9a) of the WEC is not shown in FIGS. 4-6b, but the hull 124 is similar to one shown in FIGS. 1-2. The WEC as shown in FIG. 4 contains two R-TENGs, and each R-TENG contains a rotor 128 and a stator 122. Each stator 122 contains an electrode pair 130 that is similar to the one shown in FIGS. 3a-3b. For the sake of brevity, the similar structures, shapes and functions of the rotors 128, the stators 122 and the oscillation weight 120 as compared to those in FIGS. 1-3b will not be described again, but only their differences will be described. Firstly, the substrates 122 do not have as many as notches formed at its perimeter as compared to those shown in FIGS. 1-2. Rather, on each substrate 122 there is only one notch 122e which is to allow the tabs 130e, 130f of the two electrodes of the corresponding electrode pair 130 to protrude for connection purposes. In addition, there are three connecting poles 122b that fix the two substrates 122 together, and each connecting pole 122b has a quadrilateral cross-section. Turning to the oscillation weight 120, its connecting portion 120c, while also having a triangular shape as that shown in FIGS. 1-2, is solid and does not contain any perforation. The outer end portion 120b is also having a different shape as compared to that in FIGS. 1-2. In particular, the outer end portion 120b now has a main surface that is in the shape of a rectangle. Both the upper corners and the lower corners of the outer end portion 120b are chamfered, but the cut portions from the lower corners are larger than those from the upper corners.

Figure 5A:
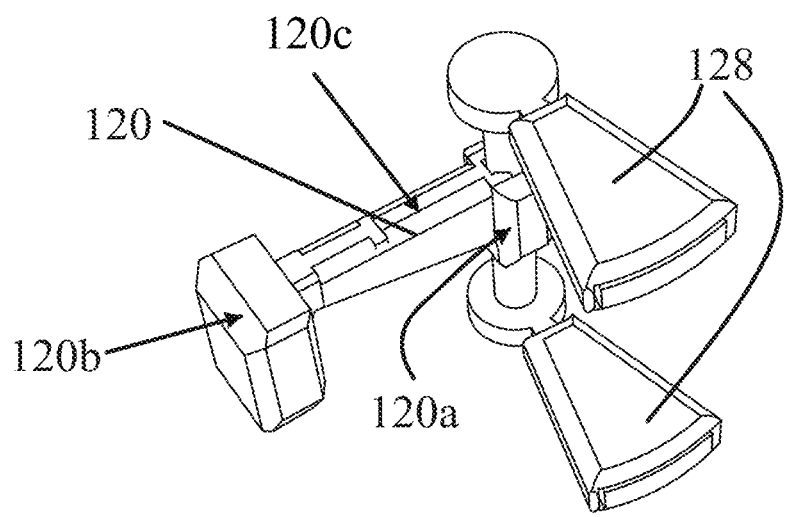
FIG. 5a shows a perspective view of the two rotors in the WEC of FIG. 4 which are interconnected by the oscillation weight.
Figure 5B:
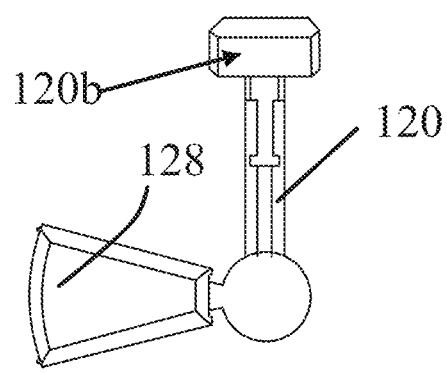
Figure 5C:
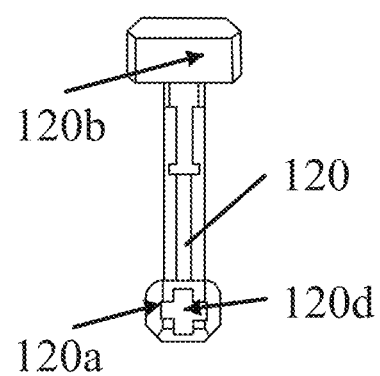
FIG. 5c shows a top view of the oscillation weight in FIG. 5a, with the rotors omitted.
Figure 6A:
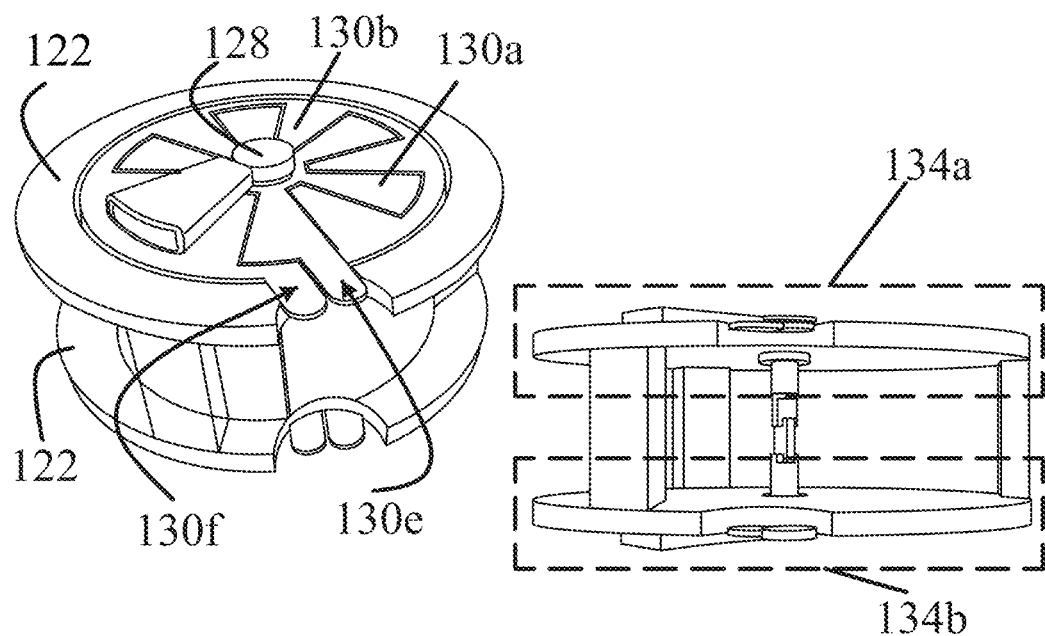
FIG. 6a shows the perspective view of the WEC in FIG. 4 from two other different angles.
Figure 6B:
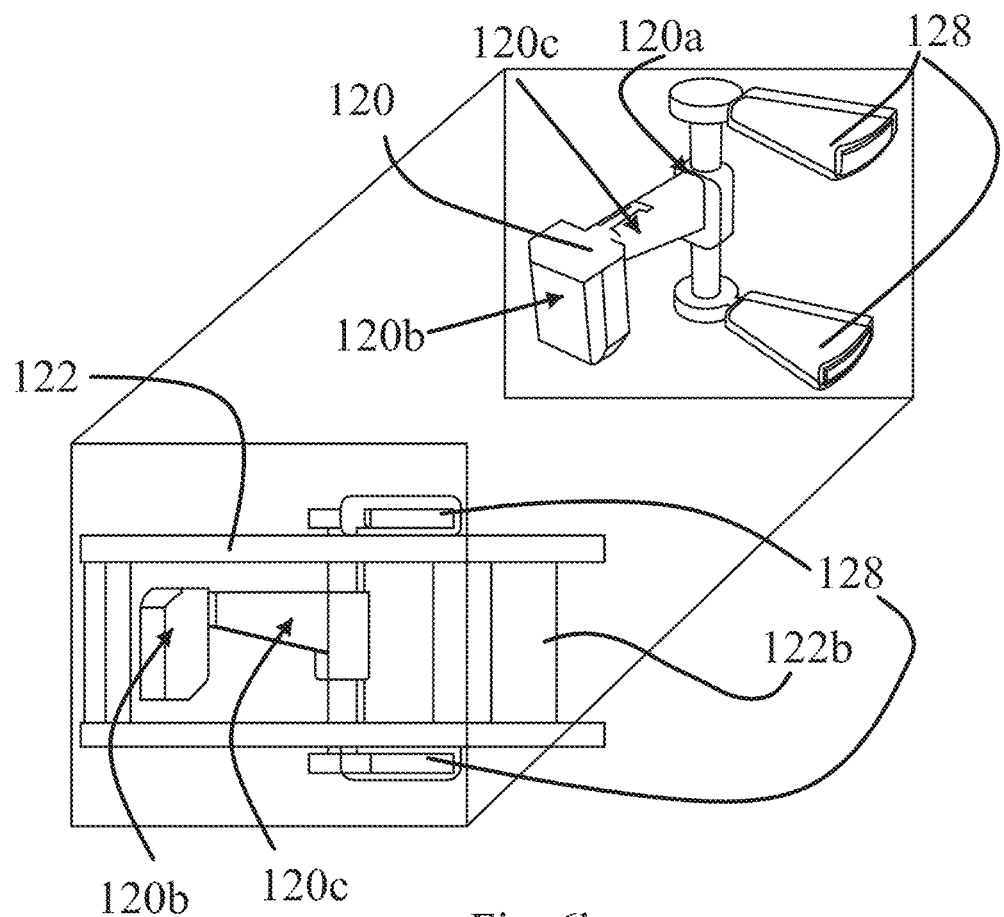
FIG. 6b shows the view of the rotor and oscillation weight assembly in FIG. 5a which is translated to a side view of the assembly.

As shown in FIG. 5c, the hole at an inner end portion 120a of the oscillation weight 120 has a hole 120d which is in the shape of a cross. The cross-shaped hole 120d is to match with the shaft 128b of each of the two rotors 128 where the shaft 128b has a corresponding cross shape which defines four keys on the circumferential surface of the shaft 128b. The cross shapes of the hole 120d and the shafts 128b prevent relative rotation between the shafts 128b and the oscillation weight 120.

The WEC in FIGS. 4-6b is designed to harvest the kinetic energy of wind-generated ocean waves through an oscillating weight that is designed to rotate along the horizontal plane (i.e., parallel to the water surface) rather than a vertical plane, which allows propagating water waves from all directions to contribute to its movement. Apart from the main similarity between the energy harvesting mechanism of an automatic watch and the WEC (i.e., the rotational motion of the oscillating weight 120), both systems rely on the use of inertia, which could generally be defined as an object's resistance to changes in its state of motion. The oscillating weight 120 in the WEC and the automatic watch possess inertia, and their rotational motion is governed by the interplay of external forces and inertia. The frequency of waves affects the angular motion of the oscillating weight 120 (i.e., the rotating mass) and the angular motion of the oscillating weight 120 can be mathematically expressed as:

$$I \times \alpha = \tau \qquad (1)$$

In equation (1), I represents the moment of inertia of the oscillating weight 120, a represents the angular acceleration and r represents the torque applied. As the propagating waves induce the tilting and horizontal motions of the buoyant spherical hull 124 of the WEC, the oscillating weight 120 starts to rotate due to the effect of gravity on the heavier mass brought by the outer end portion 120b. The torque applied to the oscillating weight 120 has an indirect relationship with the frequency of waves as it depends on the acceleration or deceleration of the oscillating weight 120. The frequency of the waves plays a crucial role in the angular motion of the oscillating weight 120 and overall performance of the WEC. When the frequency of waves matches the natural frequency of the WEC system, resonance can occur, leading to increased amplitudes of motion and possible improved energy conversion efficiency. However, excessive resonance can also lead to excessive wear on the WEC's components due to increased mechanical stresses. And if insufficient resonance occurs, the WEC may not be able to capture and harness the kinetic energy from the waves, leading to poor performance. Therefore, it is crucial to design a WEC and tune it to allow its natural frequency to match the frequency of the waves and maximize the energy harvesting capability. Through visual observation of the fabricated WEC's oscillating weight's response to hand-shaking experiments, tuning up the size, shape and materials used to build the internal rotating components of the WEC was achieved. This is accompanied by further improvements by observations from linear motor and wave tank experiments, as well as finite element method (FEM) analysis using COMSOL Multiphysics®.

Figure 7A:
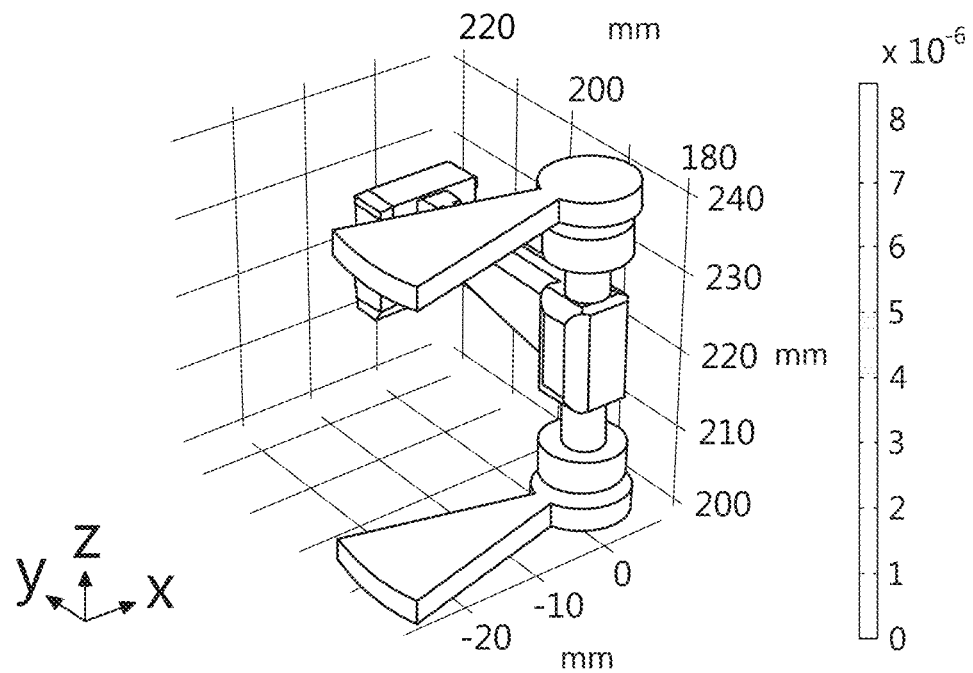
FIG. 7a shows an isometric view of a rotating/oscillating components design of the WEC in FIGS. 4-6b when the angle "θ" between the rotors and oscillating weight is set as 90°.
Figure 7B:
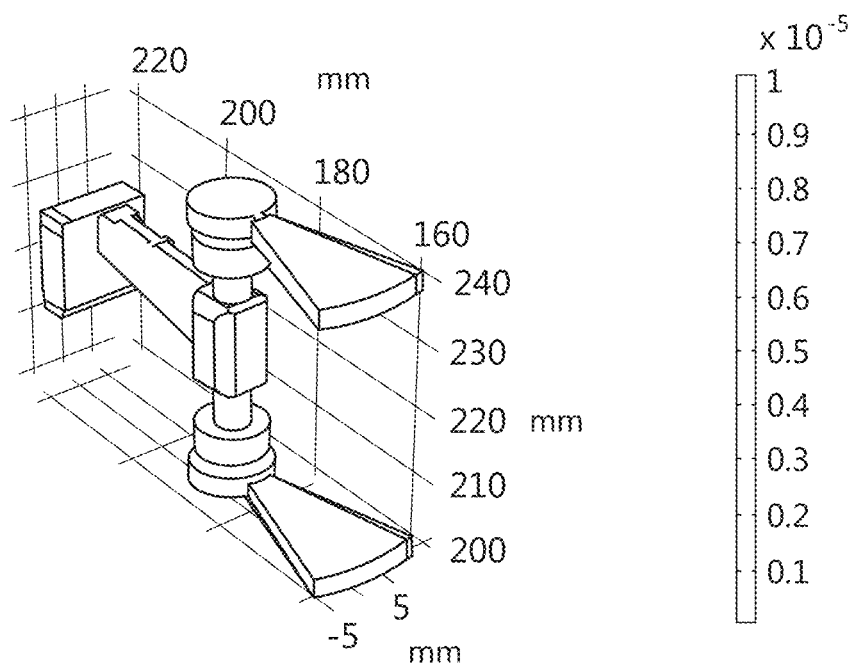
FIG. 7b shows a rotating/oscillating components design of a WEC according to another embodiment of the invention, in which the angle "θ" between the rotors and oscillating weight is set as 180°.
Figure 7C:
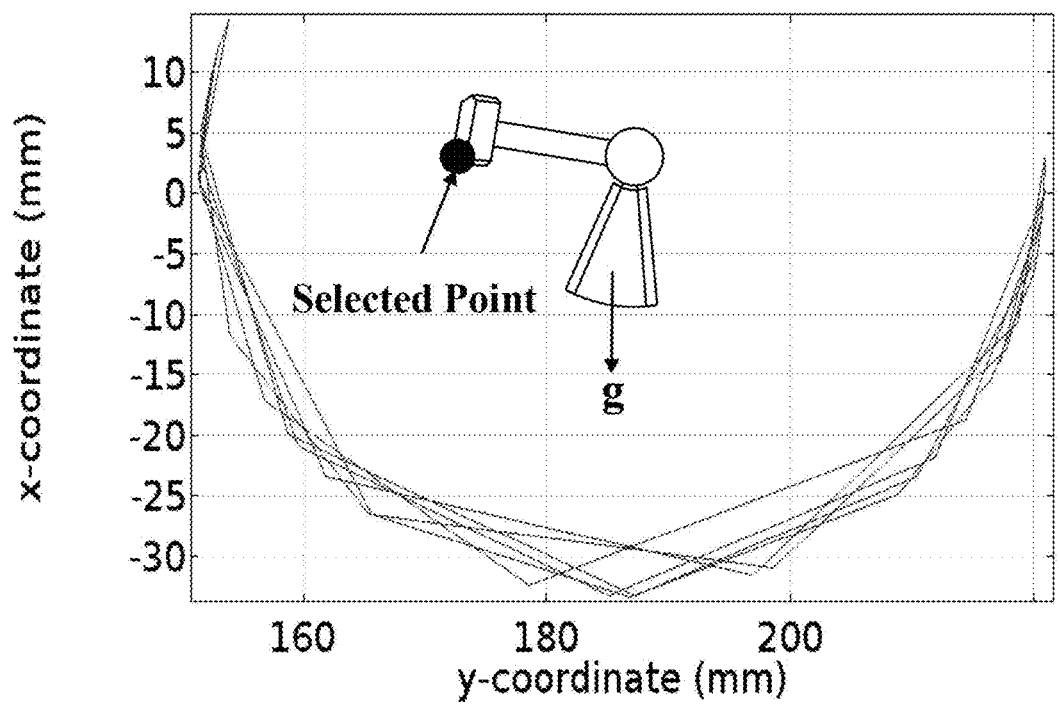
Figure 7D:
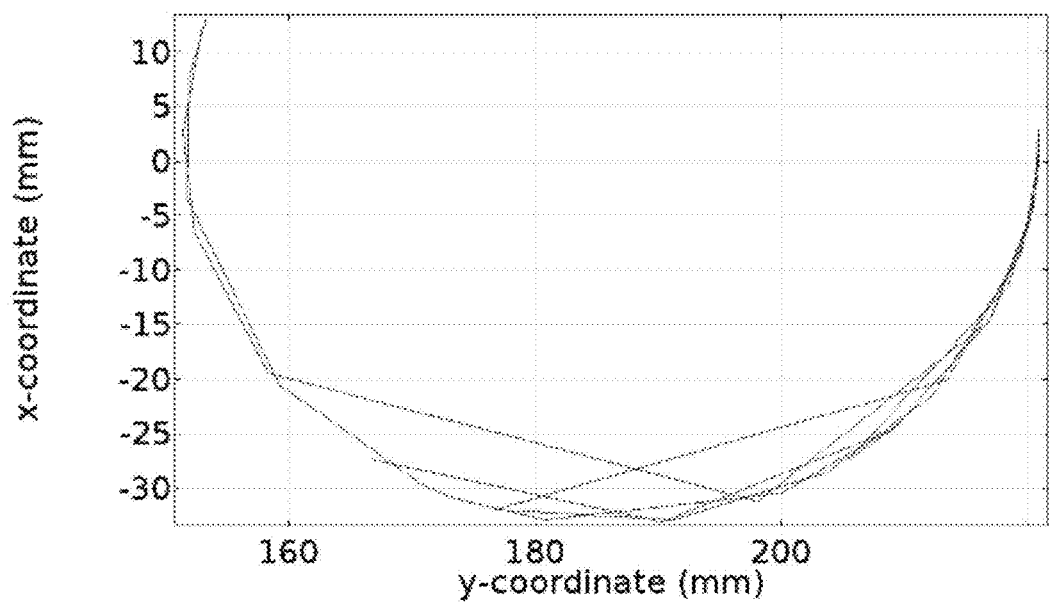
FIG. 7d illustrates tip trajectory plots showing the movement of a similar selected tip of the oscillation weight of FIG. 7b.
Figure 8A:
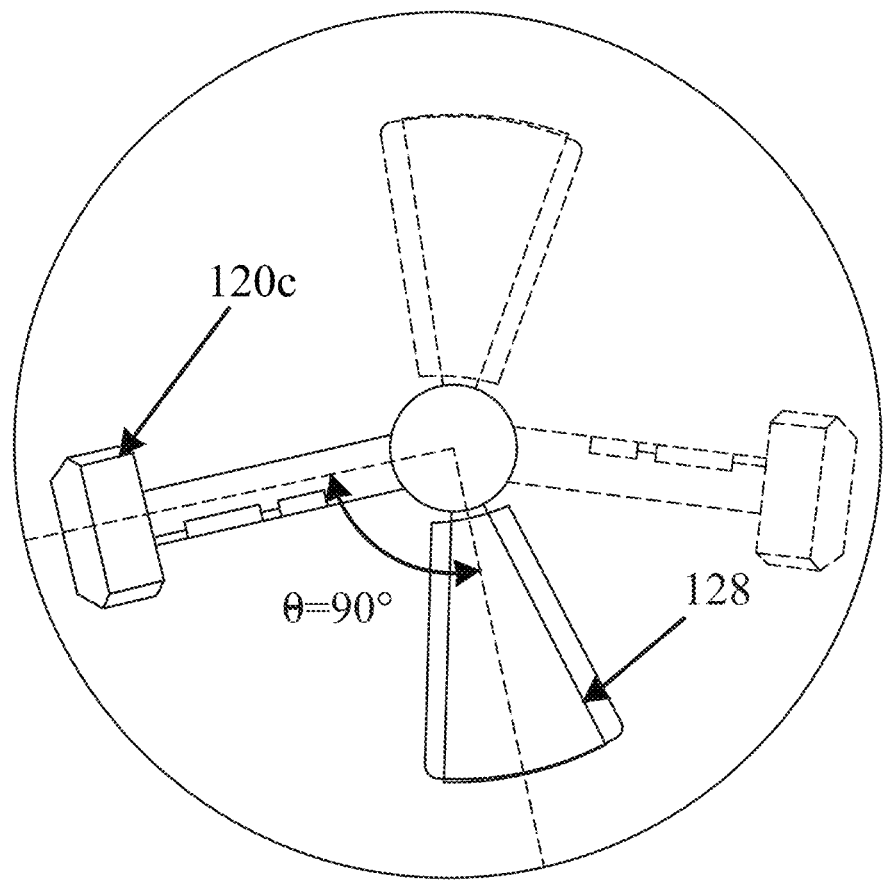

The perpendicular arrangement of the oscillating weight 120 and the rotors 128 was designed to represent a watch's rotor covering one quadrant of the horizontal plane the moving components rotate about (FIG. 8a). An angle "θ" between the rotors and oscillating weight was optimized to 90°, as physical experiments showed improved freedom of movement of the rotational components compared with θ at 180°. The effectiveness of the design was confirmed by COMSOL Multiphysics® MBD simulation. FIG. 7a shows an isometric view of the rotating/oscillating components design when the angle "θ" between the rotors and oscillating weight is set as 90°, and in comparison FIG. 7b shows an alternative design according to another embodiment, in which θ=180°. Tip trajectory plots showing the movement of the selected tip when the oscillating weight is released from the stationary position and allowed to oscillate under the effect of gravity are shown in FIG. 7c and FIG. 7d respectively. Both FIG. 7c and FIG. 7d show the same oscillation pattern with the start and end of the oscillation x and y coordinates being identical. However, the major difference is in the number of oscillations observed, with θ=90° clearly showing more oscillations than when θ=180°. This reaffirms the suitability of the perpendicular arrangement (i.e., θ=90°) between the oscillating weight and rotors for the purpose kinetic energy harvesting though oscillatory movement, which is the arrangement used in the WEC of FIGS. 1-2, and in the WEC of FIGS. 4-6b

Figure 8B:
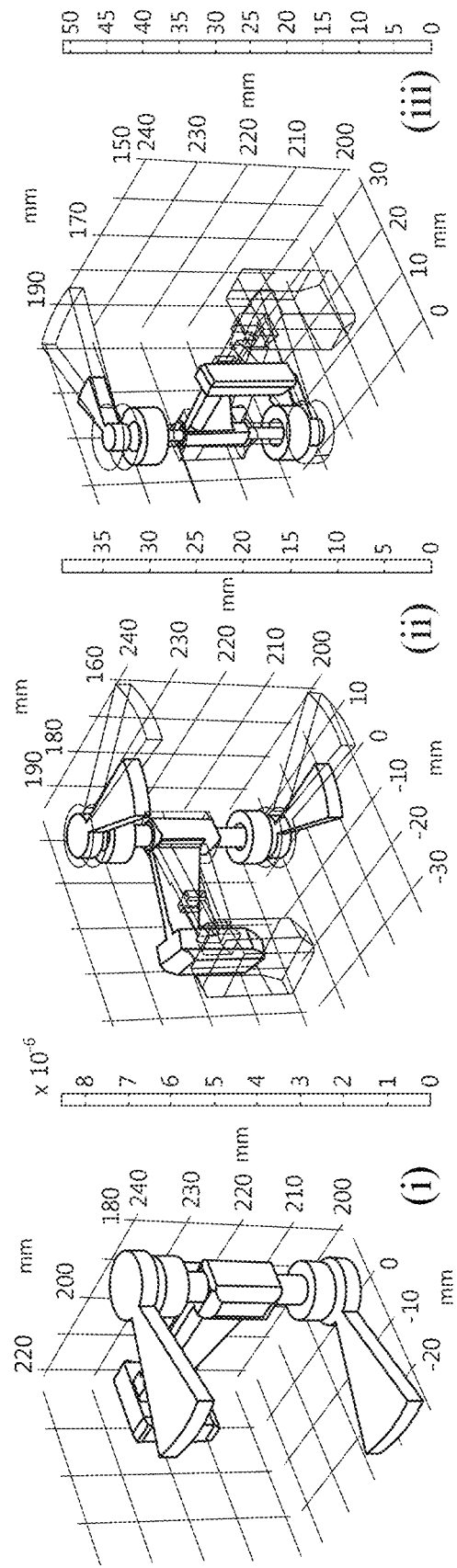
FIG. 8b includes surface displacement multibody dynamics (MBD) figures of the oscillating weight and rotors of the WEC in FIGS. 4-6b.

In designing the oscillation weight 120, structural parameters such as shaft length, oscillating weight material as well as shaft and rotor materials were all optimized using COMSOL Multiphysics® MBD. With a stainless-steel oscillating weight, flexible polylactic acid (PLA) shaft and rotors, the surface displacement MBD figures of the oscillating weight and rotors (see FIG. 8b) showed the longest surface displacement (i.e., 50 cm for the tip of the oscillating weight 120, which is half the diameter of the WEC) when the oscillating weight 120 is released from stationary position towards the direction of gravity. A full 180° angular rotation is observed in FIG. 8b and the oscillatory movement is further confirmed by the tip trajectory plot (see FIG. 7c) which shows a smooth oscillation under the effect of gravity in the −ve x-direction.

With the WEC having a partially floating and partially submerged spherical hull 124, the oscillating weight 120 is parallel to the surface of the water and can rotate regardless of the direction of approaching water waves. The tilting and horizontal movements of the hull 124 both contribute to the rotation of the oscillating weight 120. The inner components of the WEC include the two interconnected rotors 128 of the R-TENGs that are separated by columns 122b and the oscillating weight 120 that weighs heavier towards its outer tip and fixed at right angles to the single-blade rotors (see FIG. 6b). The oscillating weight 120 is heavier at the outer tip as it is made of stainless-steel. Each of the R-TENGs has a uniquely designed single-blade rotor and two 0.8 mm thick chromium (Cr) coated copper (Cu) electrodes that form the main part of the stator 122 (see FIG. 6a). The oscillating weight 120 between the R-TENGs moves in clockwise and counterclockwise directions whenever the floating spherical hull 124 is agitated by the omnidirectional water waves. The buoyant spherical hull 124 is the outer shell of the WEC that is waterproofed, sealed, and contains all the power generating components within it.

Figure 9B:
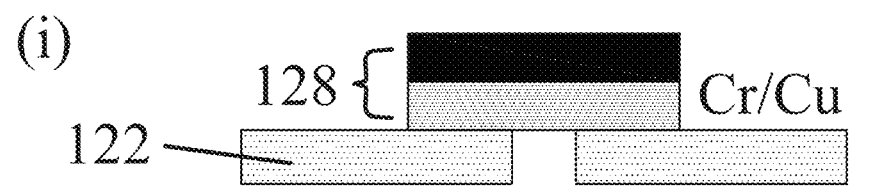
FIG. 9b illustrates the working principle of the TENG in the WEC in FIGS. 4-6b.
Figure 9B:
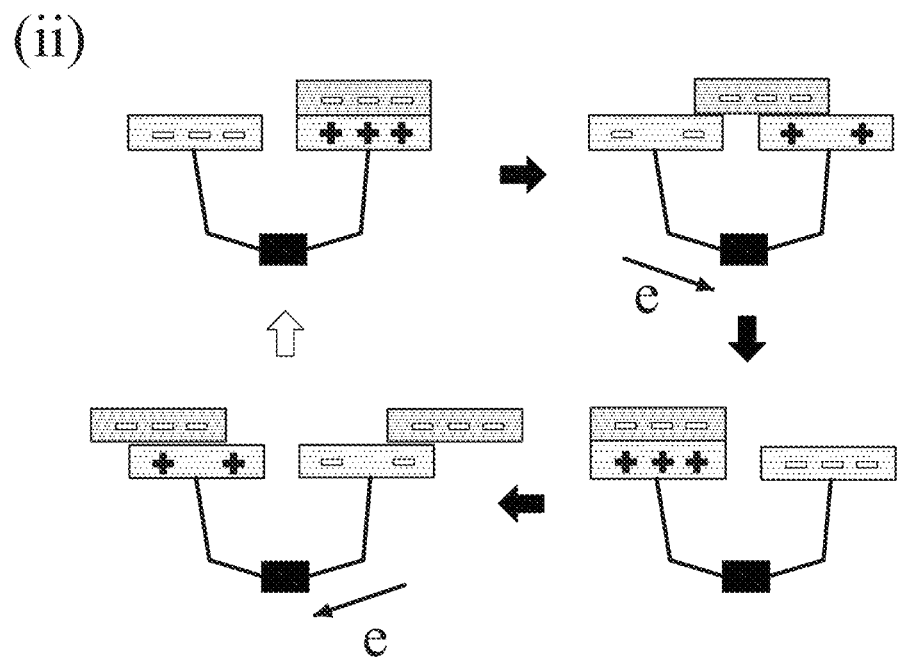
Figure 9C:
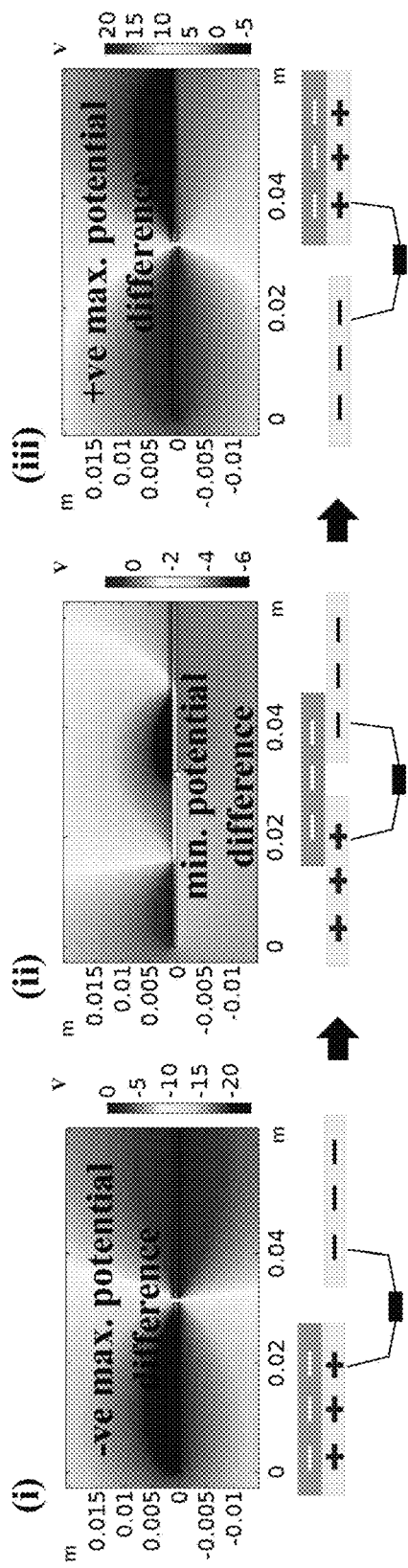
FIG. 9c depicts electrical potential simulation under open-circuit condition for the WEC in FIGS. 4-6b.

The buoyancy of the hull 124 is due to its shape, the material used (i.e., polycarbonate material) and the airtightness. The direction of movement of the oscillating weight depends mainly on the horizontal movement and angle of tilting of the spherical hull 124 (see FIG. 9a). Power generation is achieved by the triboelectric effect which is realized when the oscillating weight 120 moves the interconnected single-blade rotors 128 of the R-TENGs. Each rotor 128 is wrapped with a sheet of fluorinated ethylene propylene (FEP) film which forms the dielectric polymer triboelectric layer. The film is permanently in soft-contact with the Cr coated Cu (Cr/Cu) electrodes of the R-TENG and the movement of the rotor 128 induces friction (i.e., sliding-mode TENG) between the FEP film and the Cr/Cu electrodes 130a, 130b. This friction charges the FEP film which causes electrons of one Cr/Cu electrode 130a, 130b to flow to another Cr/Cu electrode 130a, 130b along the load circuit via electrostatic induction and such flow induces the current flow in the opposite direction. The TENG's cross-section and working principle are shown in FIG. 9b. Cr was selected as an intermediate layer to boost the output performance of TENGs through embedding it—by electroplating—between the dielectric polymer and the Cu electrode. The intermediate layer generally allows for extending the charge decay time, as well as enhancing the induced charge. FEM calculation using COMSOL Multiphysics® was used for the potential simulation under open-circuit condition to visualize the operation mechanism of the R-TENG, with results presented in FIG. 9c. The potential distribution at three representative positions is shown in FIG. 9c, with the simulation results confirming the theoretical analysis and the open-circuit experimental results.

Figure 10A:
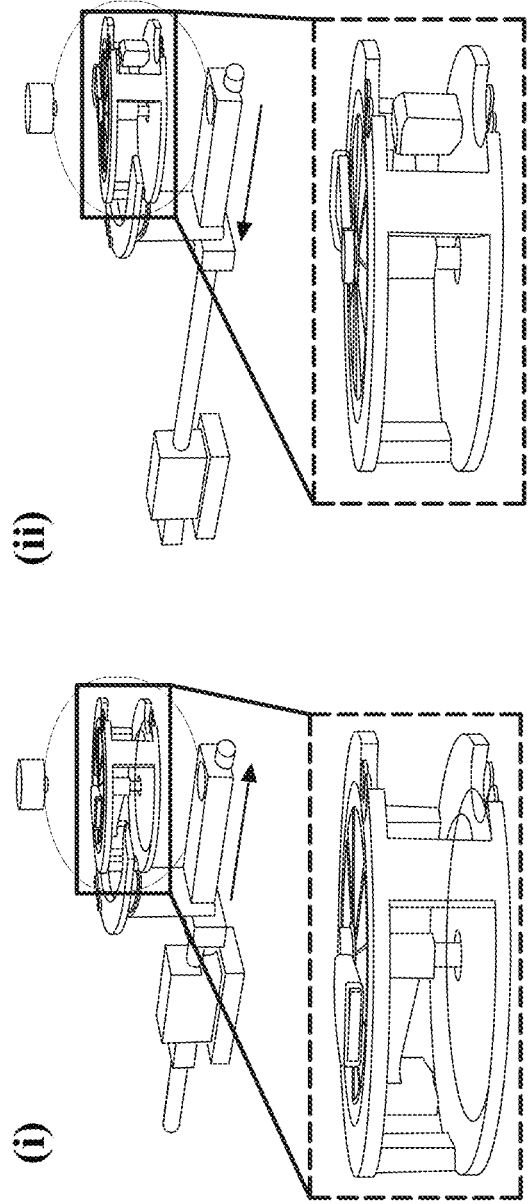
FIG. 10a illustrates a prototype WEC fixed on a linear motor to simulate horizontal motion in an experimental setup.

To test the performance of a prototype WEC made according to the embodiment of FIGS. 4-6b, a linear motor was used to drive the WEC to simulate its movement when subject to the horizontal motion of propagating ocean waves. A detailed demonstration of the experimental set up for the horizontal movement simulation is shown in FIG. 10a. The WEC was driven by a linear motor under frequencies ranging from 1 Hz to 8 Hz, which is a range that simulates the frequency of wind-generated capillary and gravity waves. The frequency range allows for testing the WEC under all operative conditions. As the linear motor drives the WEC from the initial position towards the end position, the oscillating weight does not move until the WEC body comes to a stop (i.e., at the end position), which indicates a favorable delay in kinetic energy absorption and reduces the negative impact to the internal components when subjected to an external force from propagating waves.

Figure 10B:
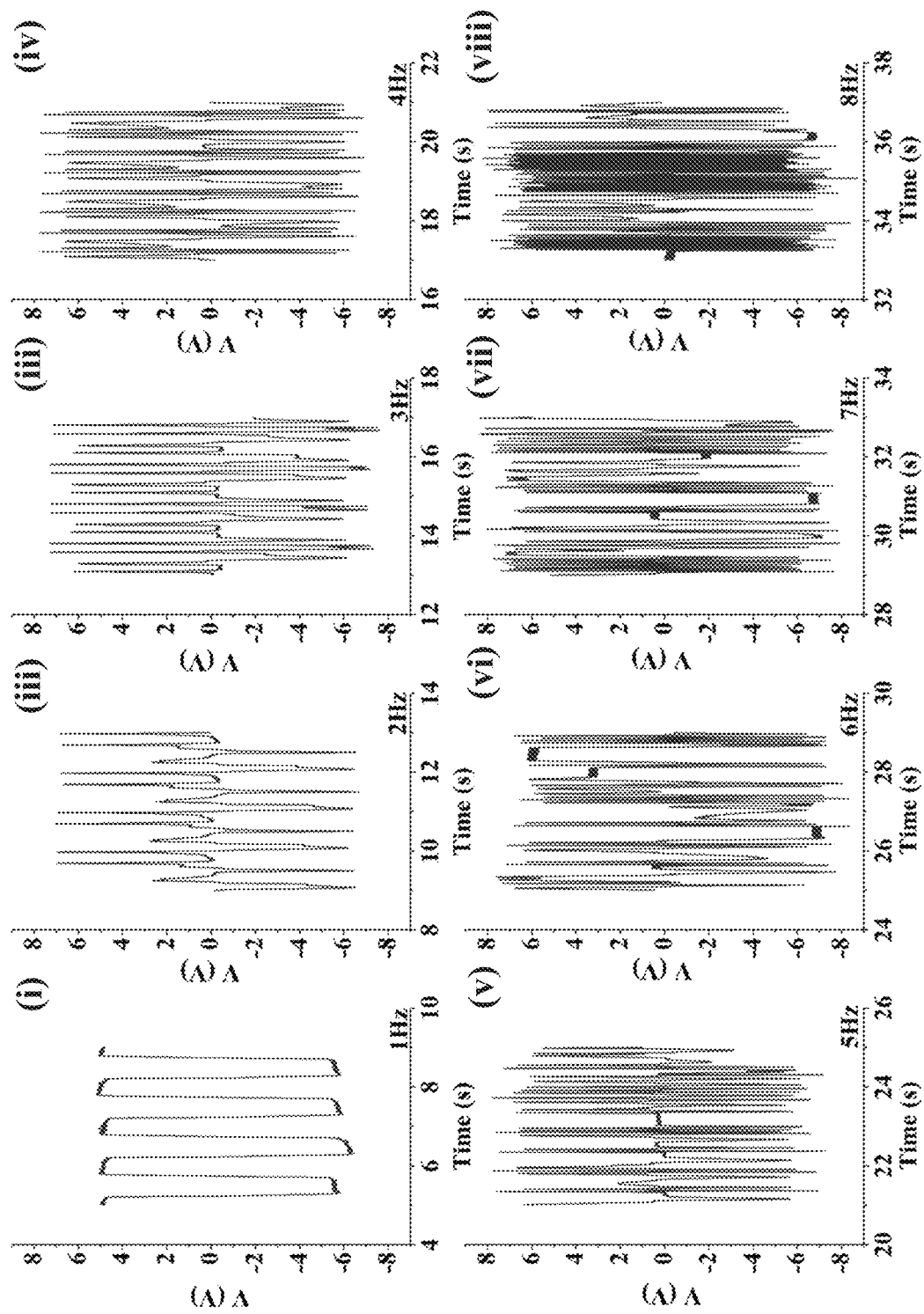
Figure 10C:
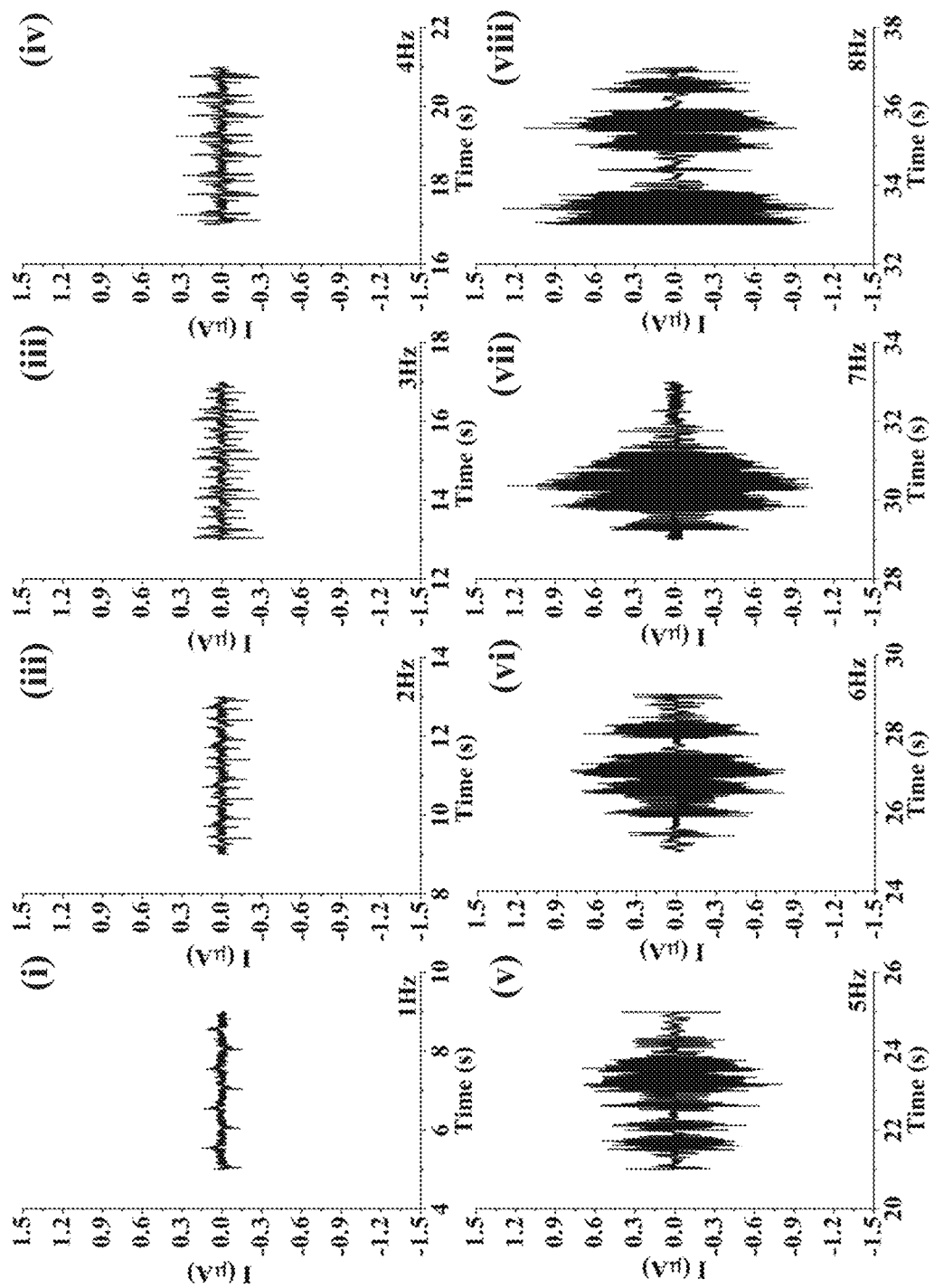

This movement mimics the automatic watch's oscillating weight kinetic energy absorbing mechanism, which—when driven by an external force from the arm's motion—can convert part of its energy into its own gravitational potential energy and when the external force is removed, the stored gravitational potential energy in the oscillating weight will be released to produce a continuous state of motion (i.e., oscillating weight rotation). The WEC had a maximum open-circuit voltage ($V_{oc}$) of 15 V, while the maximum short-circuit current ($I_{sc}$) was measured to be 1.3 µA when the WEC was driven at 8 Hz. FIG. 10b and FIG. 10c show the $V_{oc}$ and the $I_{sc}$ measurements under increasing frequencies. When driven over 3 Hz by the linear motor, the WEC would not generate any increased peak to peak $V_{oc}$, however, the peak $I_{sc}$ increased with increasing frequency, but only up to 7 Hz. The oscillating weight's faster rotation resulting in the faster sliding movement between the FEP films and the Cr/Cu electrodes of the R-TENGs did not increase beyond 7 Hz, explaining the reason why the $I_{sc}$ remained the same at 8 Hz. This is an indication that the WEC's output will remain stable under very high frequency water wave conditions. It also explains that resonance for the WEC occurs below 7 Hz based on the physical experiments. Voltage is observed to be independent of the frequency of motion, and rather dependent on the structural design—mainly the contact area—of the rotors and stators. Higher frequency of motion did not influence the amplitude of WEC's voltage outputs after 1 Hz (see FIG. 10b). In addition, the results also indicate that only the electrical current is dependent on the angular velocity of the rotors, with high motion frequencies exhibiting higher WEC current outputs (see FIG. 10c).

Figure 11A:
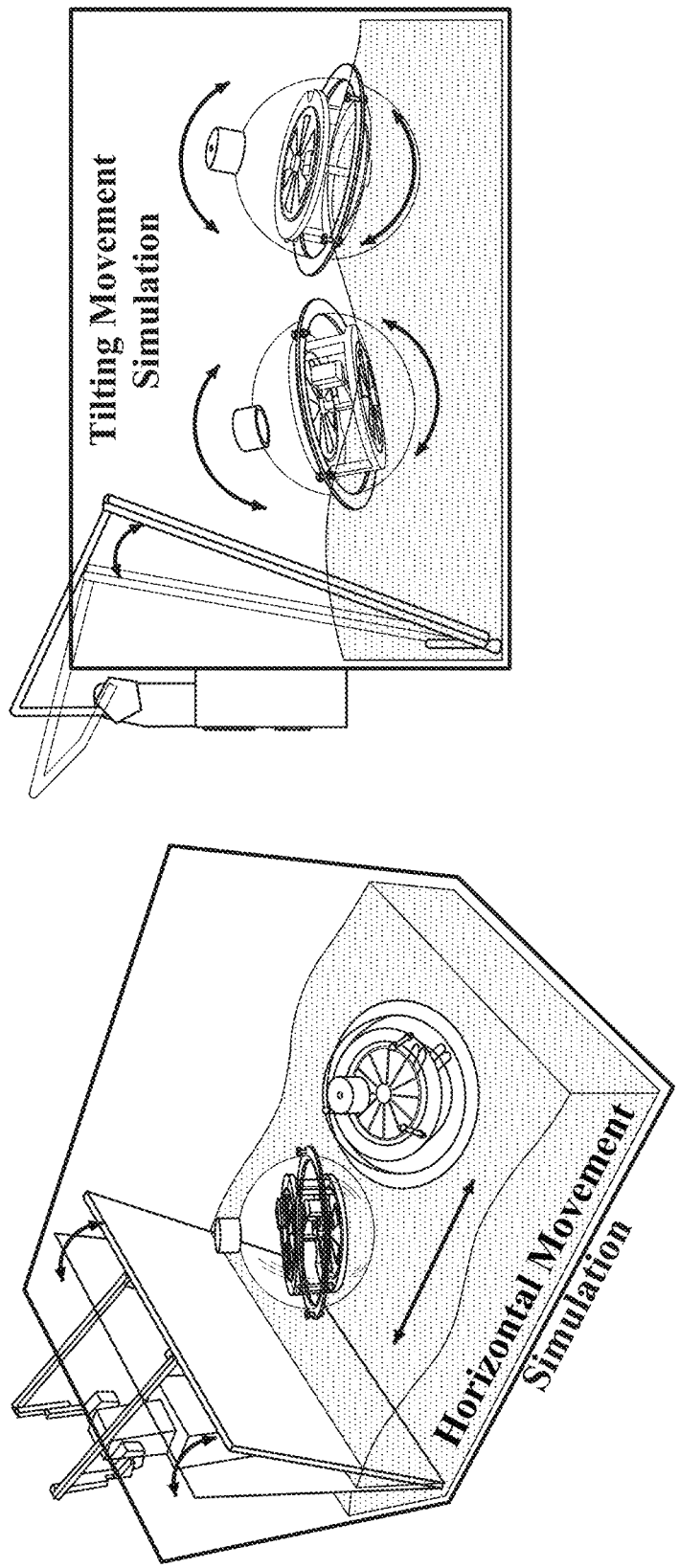
FIG. 11a is an illustration of the WEC placed in a wave tank with a wave-making motor to simulate horizontal and tilting motions.

In a separate experiment, a wave tank fitted with an in-house designed and built wave-making motor was used to simulate the combined WEC's horizontal and titling movements in ocean wave conditions with a frequency of 2 Hz which is taken as the average nearshore wave frequency. The experimental set-up as well as a demonstration of the movement of WEC inside the wave tank are shown in FIG. 11a. The power output and power density were calculated using equations (2) and (3) respectively.

$$P = I^2 R \qquad (2)$$

$$P_d = P \div \text{Volume of Spherical Hull} \qquad (3)$$

Figure 11B:
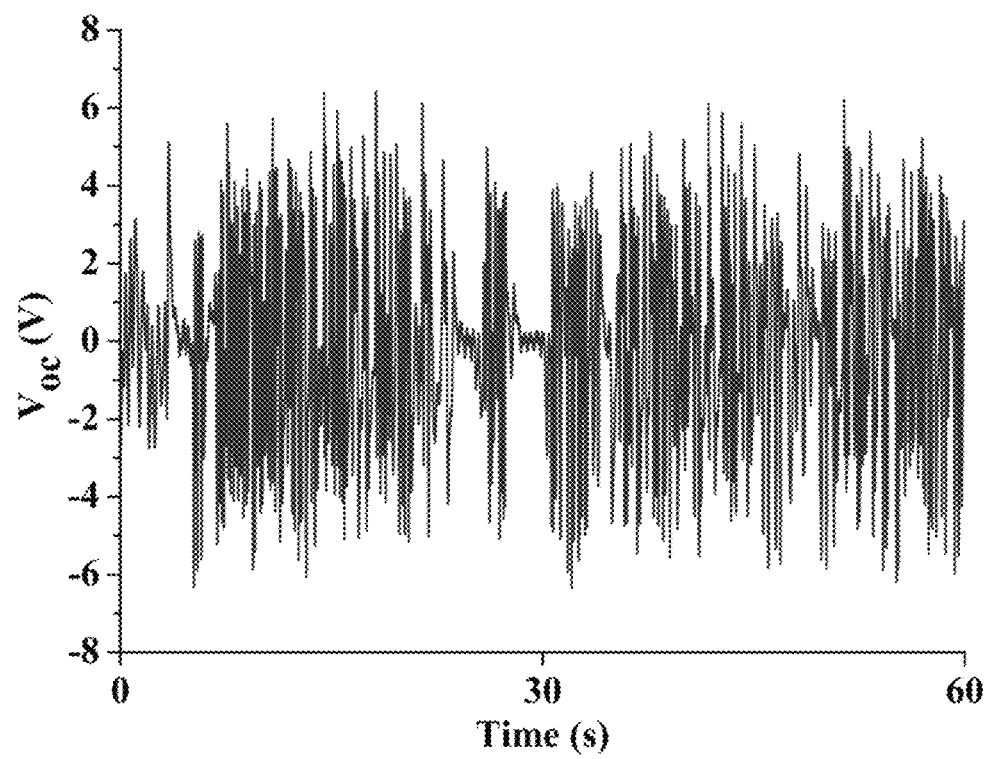
Figure 11C:
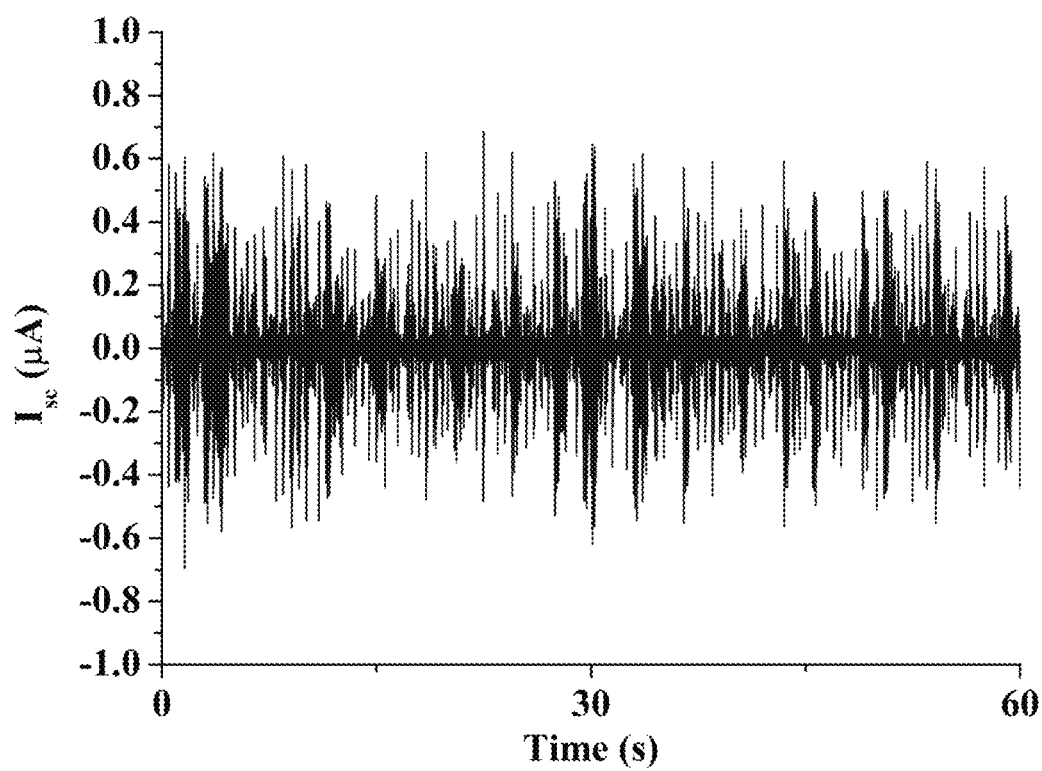
Figure 11D:
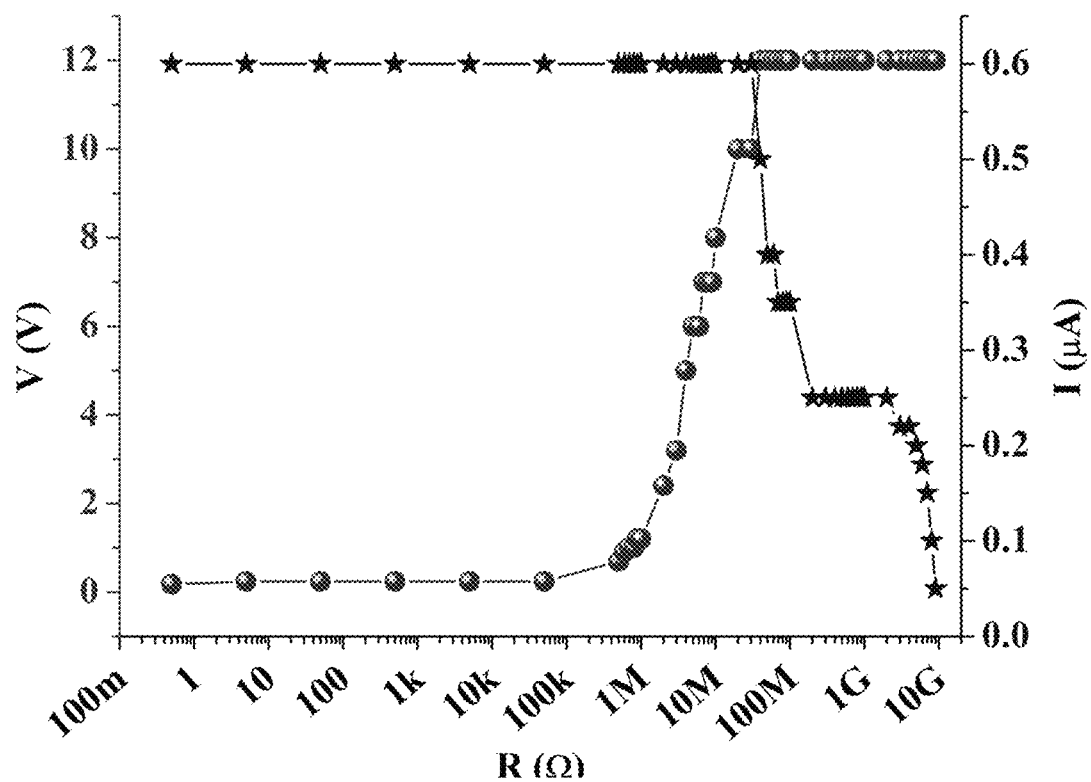
Figure 11E:
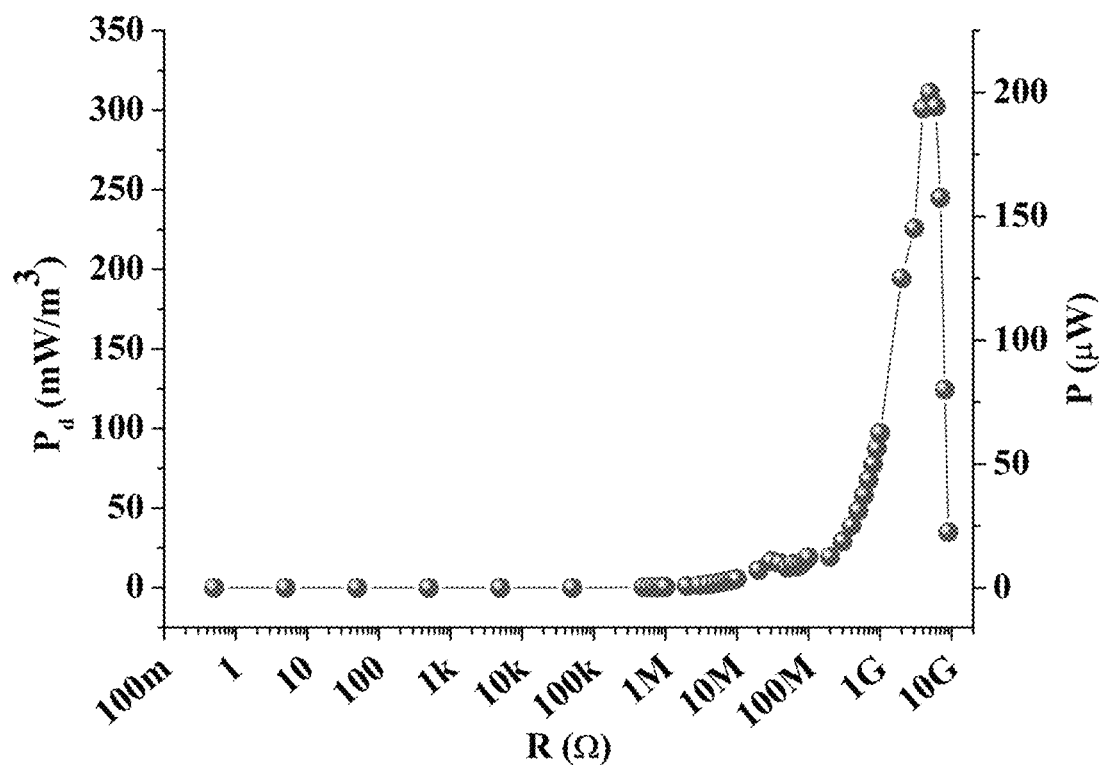

Under simulated water wave conditions in the wave tank, the WEC had a maximum $V_{oc}$ peak to peak output of 12 V and a peak $I_{sc}$ output of 0.60 µA when the wave tank motor was set at 25% of its operating capacity as shown in FIGS. 11b and 11c. At 25% of the motor's operating capacity, the measured frequency was 2 Hz with a wave height of 3 cm and wavelength of 12 cm. The maximum $V_{oc}$, 12 V, when the WEC was tested in the wave tank at 2 Hz is comparable to the output of the WEC when driven by the linear motor at 2 Hz, which was 14 V. However, the peak $I_{sc}$ observed when the WEC was tested in the wave tank, 0.60 µA, was almost triple the value of the $I_{sc}$ of the WEC when driven at 2 Hz with the linear motor, which was 0.23 µA. This could be explained by the added tilting motion experienced by the WEC in the wave tank which appeared to contribute to the increase of $I_{sc}$ value. The tilting movement causes the change of rotation direction of the oscillating weight to occur almost randomly, whereas, when driven by the linear motor, the oscillating weight would generally rotate in a single direction. This shows that the multidirectional oscillating weight's rotation caused by tilting and horizontal movements of the hull is beneficial for the device's performance, reaffirming the suitability of the design for all kinds of wave motion. FIGS. 11d and 11e show the voltage, current and power measurements under increasing load resistance when the WEC was tested at 2 Hz in the wave tank. The WEC had a peak power output of 200 µW and a power density of 304.40 mW/m³ with a matched resistance of 5 GΩ.

Figure 12A:
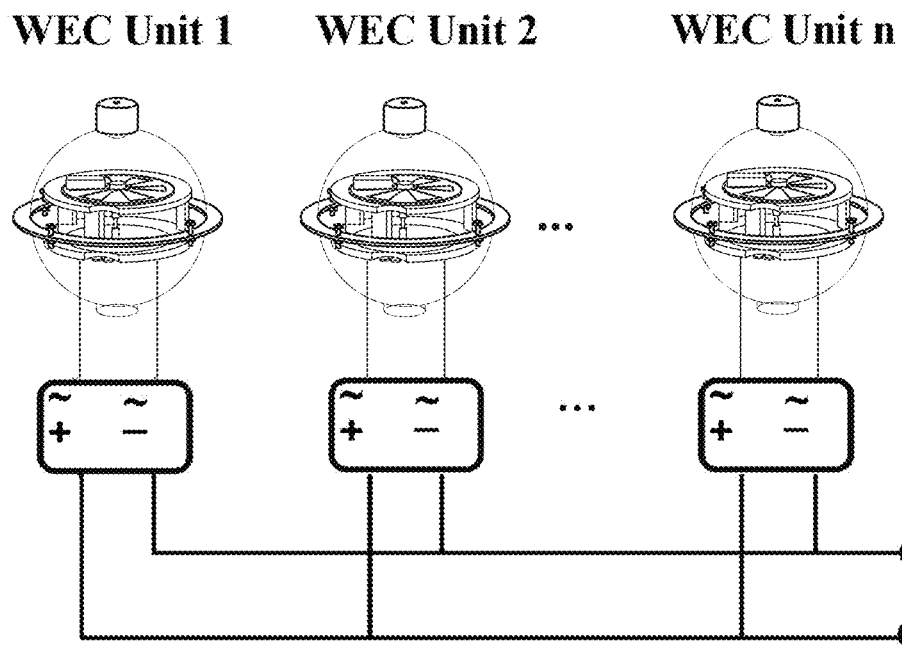
FIG. 12a is a schematic diagram for the rectification circuit of a multi-unit array in an experimental setup according to another embodiment of the invention.
Figure 12B:
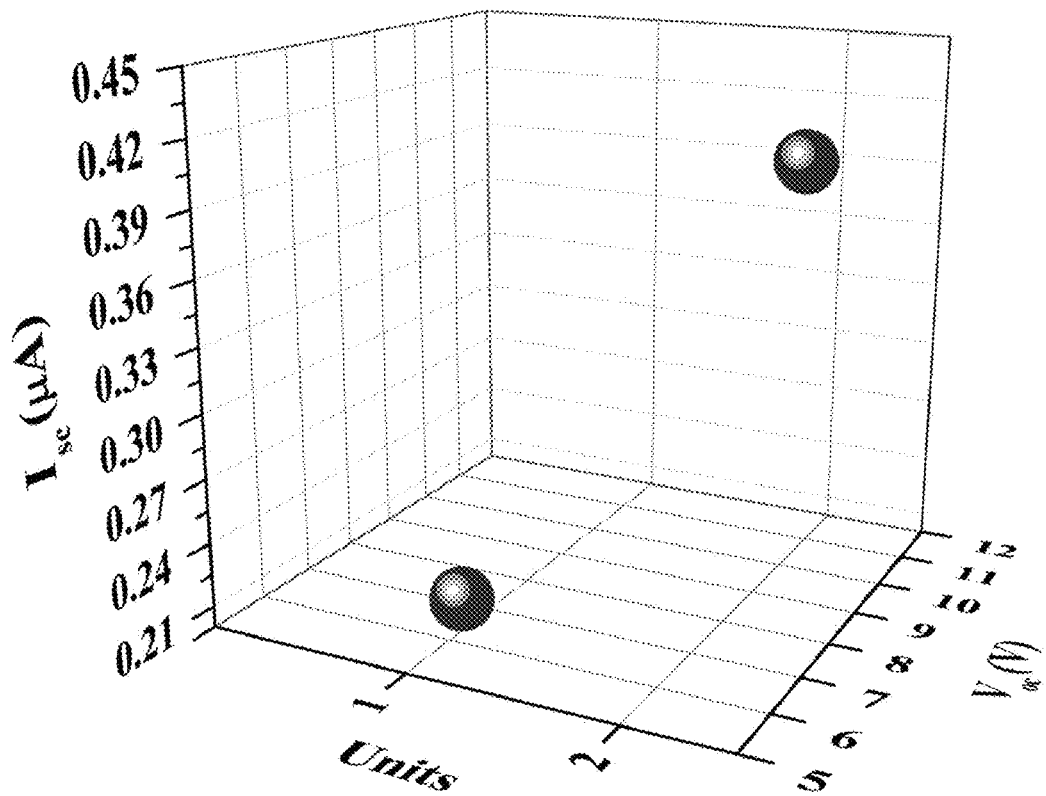

According to another embodiment of the invention, there is provided a multi-unit array that is consisted of multiple WECs, each of which may be for example the WEC in FIGS. 1-2, or the WEC in FIGS. 4-6b. For the multi-unit array, a test is conducted using a network of 2×1 units of WEC in the wave tank with the wave-making motor operating at 2 Hz. Each unit was connected to a bridge rectifier (DB105) as shown in the schematic diagram in FIG. 12a. FIG. 12b shows the increased maximum rectified $V_{oc}$ and $I_{sc}$ values with the increasing number of units connected in parallel. The measurements indicate that the voltage and current have a positive linear relationship with the number of units in the array, demonstrating the simplest scalability method for the WEC, requiring only an increase in number of WEC units for an increased electrical output.

Figure 12C:
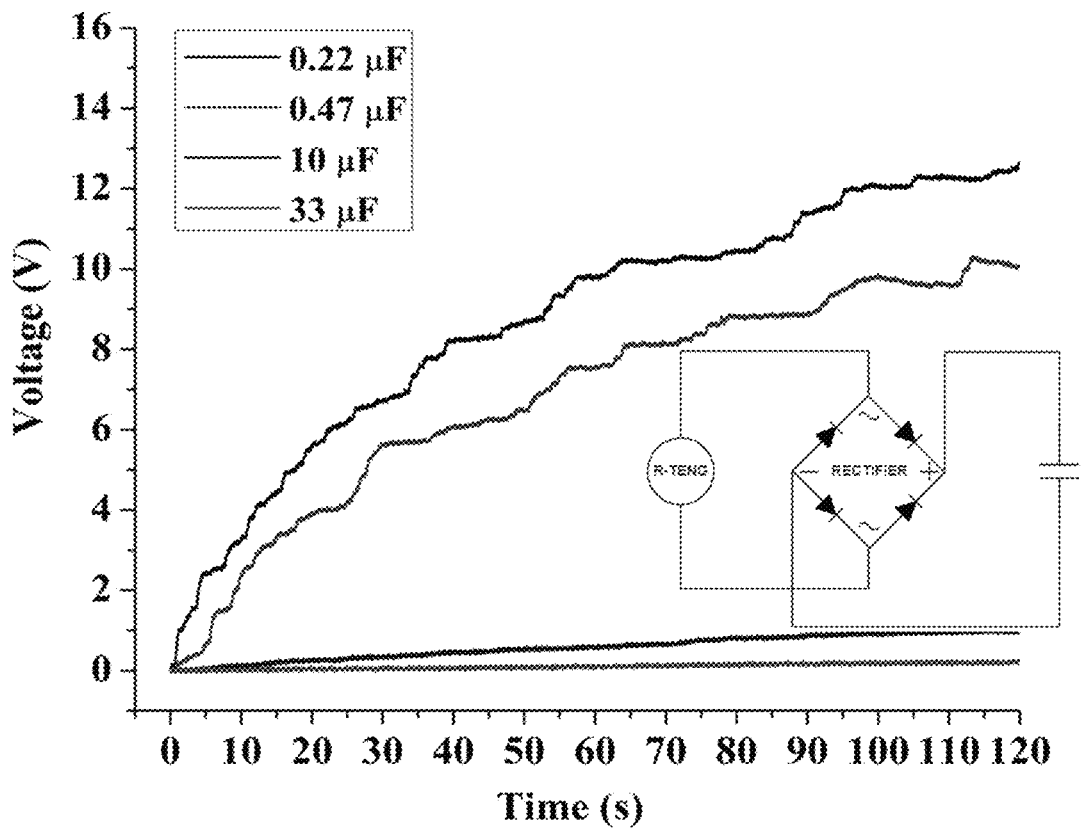
Figure 12D:
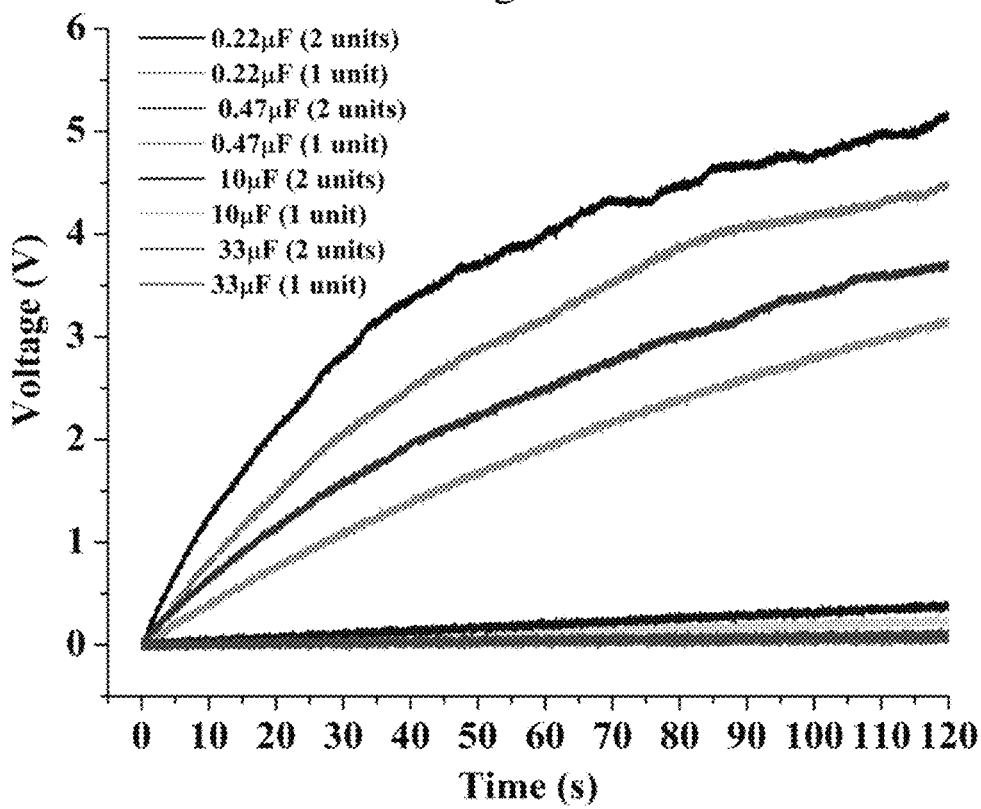

To further test the performance of WEC, capacitors were charged when the WEC was driven under 8 Hz by the linear motor and 2 Hz in the wave tank. A simple circuit was used with the R-TENG system of the WEC, and the capacitor connected in parallel with the full bridge rectifier as shown in the circuit diagram in FIG. 12c. Within 120 s, a single unit of the WEC can charge a 0.22 µF capacitor up to 12.85 V when driven by the linear motor at 8 Hz, and up to 4.45 V when driven by the wave maker in the wave tank at 2 Hz. This indicates a robust mechanical-to-electrical conversion, and the voltage curves of charging different capacitors are shown in FIG. 12c and FIG. 12d. Under low-frequency motion (i.e., 2 Hz in the wave tank), the device demonstrates a stable performance when charging capacitors without any voltage decline at 120 s and this indicates that WEC can effectively harvest low-frequency kinetic energy and supply power to small electronics. As for the 2×1 array network, within 120 s, the network can charge a 0.22 µF capacitor up to 5.25 V (FIG. 12d). 2 WEC units generally show an increase in capacitor charging performance as compared to a single WEC unit, which further confirms the scalability of the WEC. The WEC charges a 4.7 µF capacitor up to 3.2 V in 33 minutes, with the electrical energy stored in the capacitor being able to power up a stopwatch for 2 s.

Figure 12E:
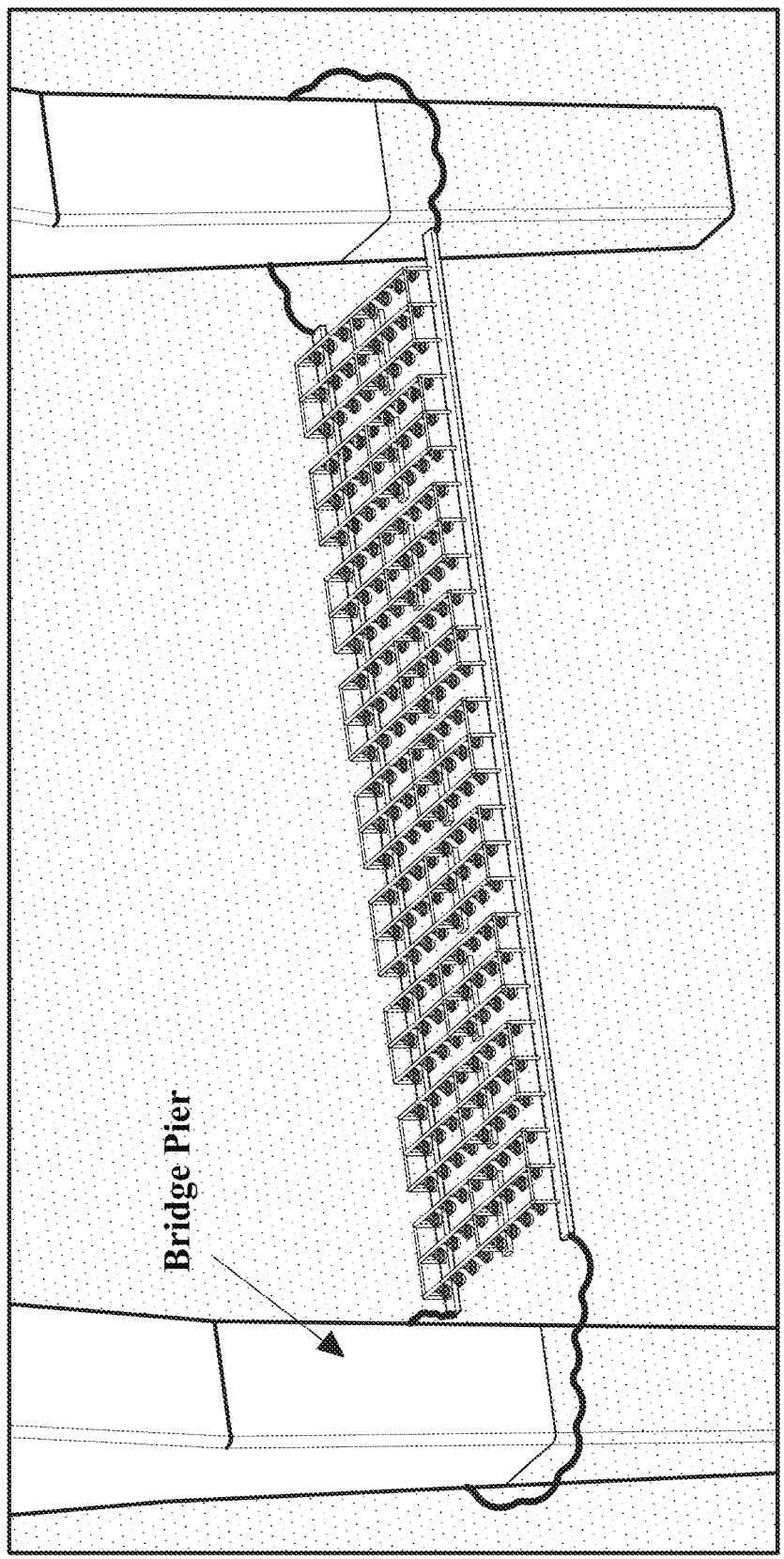
FIG. 12e illustrates the array with a floating mooring system connected to a bridge pier.
Figure 12F:
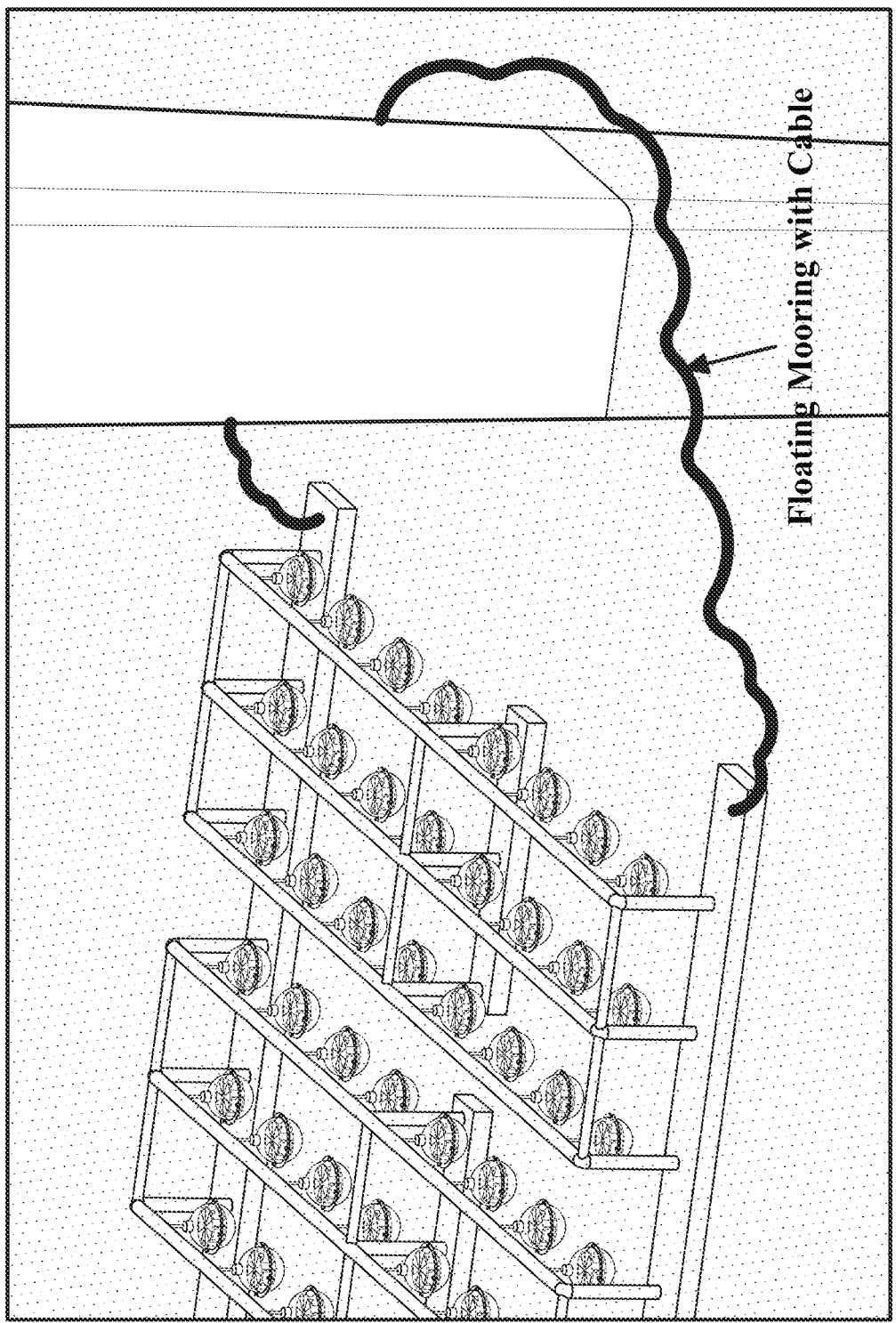
FIG. 12f illustrates the floating mooring system of the array.

FIG. 12e shows an illustration of the WEC array arrangement in a nearshore setting connected to a stationary structure, a bridge pier. The mooring is designed as a floating mooring system with the cables forming part of the mooring system (FIG. 12f). This array design shows that effect of the WEC array on marine life is minimal since the nature of the open working spaces within the array allows for sunlight to pass through without any affect to the regular photosynthetic activities of the marine ecosystem. Seabed disturbance due to mooring is non-existent.

The following part of the descriptions will be about the method and techniques used for fabricating the prototype WECs. The rotors, oscillating weight and stators' main structure were designed using Shapr3® (see FIG. 4). The rotors were printed with a Flashforge Adventurer® 3 3D printer using flexible polylactic acid (FPLA) material. FPLA material is one of the most commonly available types of filaments for 3D printers with multiple colors and textures commercially available. The oscillating weight's tip was fabricated by Computer Numerical Control (CNC) machining with stainless steel as the material used. As for the shaft of the rotor, it was 3D printed using FPLA. The stator was 3D printed in PC material. As for the Cr/Cu electrodes, they were designed using Shapr3D as well (see FIGS. 3a-3b) and were produced by CNC machining and then fitted into the 3D printed PC stators to form the electrodes of the R-TENG. The two stators of the R-TENG were fabricated first and attached to one another with columns to leave a space between them to fit the oscillating weight. The inner part of the oscillating weight shaft has a cross-shaped hole, and this allows the shafts of the two single-blade rotors to pass through and connect to one another (see FIGS. 7a-7b). Two 10×5×4 mm ball bearings were fitted within the stators and the shaft of the two single-blade rotors were designed to pass through the 5 mm inner diameter of the ball bearings. Each of the single-blade rotors was wrapped with 3 layers of FEP film of 0.2 mm thickness. The wrapping method allowed the rotor's FEP film to be in constant soft contact with the Cu electrodes, with minimal friction during the sliding movement. The spherical hull including the upper and lower half spheres was also designed using Shapr3D (see FIG. 2) and 3D printed using PC material. PC material was used due to its transparency and strength. The two half spheres were attached with M3 bolts and a ring of silicone rubber between them. To enhance waterproofing, the silicone rubber ring was coated with pure silicone grease, which is similar to the method used to waterproof watches. The wires connecting the electrodes of the device extend to the outer part of the upper portion of the spherical hull.

The open-circuit voltage and short-circuit current were measured by a Keithley® 6514 system electrometer. The characterizations were carried out in two settings, firstly with the WEC driven by a linear motor, to mimic the horizontal motion of propagating ocean waves. Secondly, with the WEC in a wave maker tank to simulate the combined horizontal and titling movements in ocean water waves. The wave maker in the wave tank was built with LEGO® components. The motor used to drive the wave maker is a LEGO® EV3 Large Servo Motor that uses tacho feedback for precise control up to one degree of accuracy for its built-in rotation sensor. The motor is controlled by an EV3 Intelligent Brick® that has an ARM® 9 processor with a Linux-based operating system. The brick allows input of various programming commands from the EV3 software, and it also allows for data logging. A simple program was inputted into the brick that allowed for controlling the speed of the motor, measuring the average frequency of the motor's movement, and displaying it on the EV3 Intelligent Brick's screen.

In summary, exemplary embodiments of the invention described above provide an innovative WEC design incorporating an automatic watch inspired oscillating weight and R-TENGs for harvesting kinetic energy of wind-driven ocean water waves was demonstrated to work effectively when tested under simulated water wave conditions using a linear motor and in a wave tank. The WEC can harvest omnidirectional water waves due to its oscillating weight that is positioned parallel to the surface of the water and allowed to rotate 360° bidirectionally along the horizontal plane. Any titling or horizontal motion due to the propagating waves contributes to the movement of the oscillating weight which drives the motion of the single-blade rotors of the R-TENGs. The oscillating weight's structural parameters and its position relative to the rotors' position were both optimized by MBD simulation using COMSOL Multiphysics®. The single-blade rotors which are fixed at right angles to the oscillating weight and wrapped with FEP films are in soft contact with the Cr/Cu electrodes. Each single-blade of each R-TENG is designed to be able to rotate with minimal friction with the Cr/Cu electrodes without hindering the movement of the oscillating weight. The multi-unit array of the WEC showed that the electrical output scales up with the increase of units, proving that the design is scalable. Moreover, the device design is superior to previous works as it has multiple attributes that previous works fall short of, namely its ability to harvest omnidirectional ocean waves when moved horizontally, tilted, or even overturned, it can also work in omni-frequency wave environments without a mooring system (see Table 1 for example). In particular, Table 1 shows a comparison of the output and design attributes of the WEC in FIGS. 4-6b with previous triboelectric rotational-based wave energy harvesters.

TABLE 1

| | | Wave Tank Testing | | | | |
| --- | --- | --- | --- | --- | --- | --- |
| Journal | TENG Type | Power Output (µW) | Power Density (mW/m3) | Wave Height (cm) | Simulated Water Wave Frequency (Hz) | Design Attributes (See Note) |
| Applied Physics Reviews (2020)[32] | Cylindrical TENG | 18.90 | 39.80 | 9.00 | 0.03 | d, e |
| Advanced Energy Materials (2020)[33] | Cylindrical TENG | 93.00 | 26.30 | 10.00 | 1.20 | b, d, g |
| AIP Advances (2020)[35] | Pendulum TENG | 8.01 | 4.54 | NA | 1.40 | a |
| Nano Energy (2020)[36] | Pendulum TENG | 18.00 | NA | 7.00 | 2.00 | b |
| This work | Rotational TENG | 200.00 | 304.40 | 3 | 2.00 | a, b, c, d, e, f, g |

The power output and power density of the WEC are also superior to previous rotational-based TENG devices with the output achievable in a wave tank with a much shorter wave height, indicating a great potential for wave energy harvesting in shallow and nearshore water environments (for example see Table 1). Embodiments of the invention therefore serve to promote sustainable ocean wave energy harvesting by introducing an innovative way of combining the concept of the oscillating weight of an automatic watch with triboelectrification to develop a WEC that is simple to build and upscale. In addition, installation of WEC can be done in various ocean environments, whether nearshore or offshore, as it does not need a mooring system to attach it to the seabed. This is foreseen to contribute to the reduction of costs, such as construction, maintenance, and transmission, normally associated with installing WECs in ocean environments requiring specifically designed mooring systems that depend on site locations. Finally, to maximize the kinetic energy harvesting potential from ocean waves, site locations for the placement of the WEC arrays should be selected based on the range of the wave frequencies the WEC was tested in this study. This will allow for maximum power interception and output.

The WECs described above according to exemplary embodiments of the invention each contain main components that include an oscillating weight inspired by the automatic watch's oscillating weight and a pair of rotational triboelectric nanogenerators (R-TENGs). The WECs were demonstrated to be able to absorb water-wave energy from all directions and convert the kinetic energy into electrical energy through the R-TENG system under low to high frequency simulated water wave motion. The main function of the WECs is to convert the kinetic energy of ocean waves into a mechanical movement that is converted into electrical energy through electrostatic induction between the dielectric rotors and the metal electrodes. A single unit of the WEC can power small electronics. An array of multiple WECs (i.e., a wave energy converter farm) could power coastal building electric appliances, or could be connected directly to the electrical grid or used as a power source (e.g., for battery charging, green hydrogen production, etc.).

Advantages of the WECs described above according to exemplary embodiments of the invention include but not limited to:

Omnidirectional wave energy harvesting ability
Demonstrated ability to work in both low frequency and high frequency water wave environments
No mooring system required
The wave energy converter works when overturned
Proven scalable by increasing the number of units
Hull design intended for the actual environment with the inner components of wave energy converter waterproofed
Individual wave energy converters in a network can move independently of one another The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

What is claimed is:

1. A wave energy converter (WEC), comprising:
   a) a housing;
   b) a stator which is fixed to the housing;
   c) a rotor movable to the stator;
   d) an oscillating mass rotationally fixed to the rotor such that there is no relative rotation between the oscillating mass and the rotor; wherein the oscillating mass is adapted to oscillate as a result of tilting and horizontal movements of the housing and adapted to rotate along with the rotor coaxially;
   wherein a friction generated between the rotor and the stator upon relative movement between the stator and the rotor induces electricity.

2. The wave energy converter of claim 1, further comprises a pair of electrodes attached to a substrate of the stator; the electricity adapted to be induced from a friction between the rotor and the pair of electrodes.

3. The wave energy converter of claim 2, wherein the substrate is in a substantially circular shape.

4. The wave energy converter of claim 2, wherein the electrodes are each in a planar shape, and the electrodes are superimposed one over another.

5. The wave energy converter of claim 4, wherein one or both of the electrodes are formed with patterns of circular sectors.

6. The wave energy converter of claim 1, wherein the rotor further comprises a rotor shaft and a rotor body; the oscillating mass connected to the rotor shaft for co-rotation with the rotor.

7. The wave energy converter of claim 6, wherein the rotor body is wrapped with a dielectric film that is in soft contact with the electrodes.

8. The wave energy converter of claim 7, wherein the dielectric film is a sheet of fluorinated ethylene propylene (FEP).

9. The wave energy converter of claim 6, wherein the oscillating mass comprises an inner portion and an outer portion that are aligned along a radial direction with respect to oscillation of the oscillating mass; the outer portion being heavier than the inner portion.

10. The wave energy converter of claim 9, wherein the inner portion of the oscillating mass is formed with a hole for coupling to the rotor shaft of the rotor.

11. The wave energy converter of claim 9, wherein an axis of oscillation of the oscillating mass coincides with a rotating axis of the rotor shaft.

12. The wave energy converter of claim 6, wherein the rotor body has a shape of a circular sector.

13. The wave energy converter of claim 1, comprises a pair of rotational triboelectric nanogenerators each of which containing one said rotor, one said stator, and one said pair of electrodes.

14. The wave energy converter of claim 13, wherein each said stator comprises a substrate; the two substrates are separated but connected to each other by a plurality of connecting poles.

15. The wave energy converter of claim 14, wherein the oscillating mass is located substantially within a space defined by the two substrates; both of the rotors connected to the oscillating mass.

16. The wave energy converter of claim 1, wherein the oscillating mass is adapted to rotate 360° in clockwise and anticlockwise directions.

17. The wave energy converter of claim 1, wherein the oscillating mass or the substrate is made from a polylactic acid (PLA) material.

18. The wave energy converter of claim 1, wherein the housing has a substantially spherical shape.

19. The wave energy converter of claim 18, wherein the housing is made from a polycarbonate (PC) material.

* * * * *